(12) United States Patent
Miller et al.

(10) Patent No.: US 6,467,836 B1
(45) Date of Patent: Oct. 22, 2002

(54) IMPACT SUPPRESSION DEVICES HAVING ENERGY ABSORPTION CAPABILITY

(75) Inventors: Richard L. Miller; Edward J. Morris, both of Bay City, MI (US)

(73) Assignee: Eurion Corporation, Midland, MI (US)

( * ) Notice: Subject to any disclaimer, the term of this patent is extended or adjusted under 35 U.S.C. 154(b) by 0 days.

(21) Appl. No.: 09/841,259

(22) Filed: Apr. 24, 2001

Related U.S. Application Data

(63) Continuation-in-part of application No. 09/076,411, filed on May 12, 1998, now abandoned.

(51) Int. Cl.[7] .............................................. B60R 27/00
(52) U.S. Cl. ........................ 296/189; 293/133; 280/777; 188/374
(58) Field of Search ................................. 296/188, 189; 293/107, 109, 132–134; 74/492; 280/777; 188/374

(56) References Cited

U.S. PATENT DOCUMENTS

| | | | |
|---|---|---|---|
| 3,053,526 A | * | 9/1962 | Kendall |
| 3,435,700 A | | 4/1969 | Calhoun |
| 3,454,397 A | | 7/1969 | Yoshioka et al. |
| 3,530,737 A | | 9/1970 | Higginbotham |
| 3,656,366 A | | 4/1972 | Somero |
| 3,671,068 A | * | 6/1972 | Gerhard |
| 3,711,080 A | * | 1/1973 | Kendall |
| 3,795,390 A | | 3/1974 | Kendall et al. |
| 3,843,601 A | * | 10/1974 | Bruner |
| 3,976,287 A | | 8/1976 | Kendall et al. |
| 4,019,403 A | | 4/1977 | Kondo et al. |
| 4,255,986 A | | 3/1981 | Mukoyama |
| 4,643,448 A | | 2/1987 | Loren |
| 4,674,354 A | | 6/1987 | Brand |
| 4,686,764 A | * | 8/1987 | Adams et al. |
| 5,482,320 A | | 1/1996 | Passbecq |
| 5,618,058 A | | 4/1997 | Byon |

FOREIGN PATENT DOCUMENTS

| | | |
|---|---|---|
| GB | 1382131 | 1/1975 |
| GB | 1386646 | 3/1975 |
| GB | 1439347 | 6/1976 |

\* cited by examiner

Primary Examiner—Dennis H. Pedder
(74) Attorney, Agent, or Firm—Robert L. McKellar

(57) ABSTRACT

Impact suppression devices having energy absorbing capability. The devices utilize a spline configuration for two separate shafts that are movably joined such that one can move axially inside the other. The shafts themselves can act as a piston, or a piston is used as part of the components. Impact absorption is provided by a gel layer or gel layers that have hydraulic fluid properties when a force is applied to them.

46 Claims, 16 Drawing Sheets

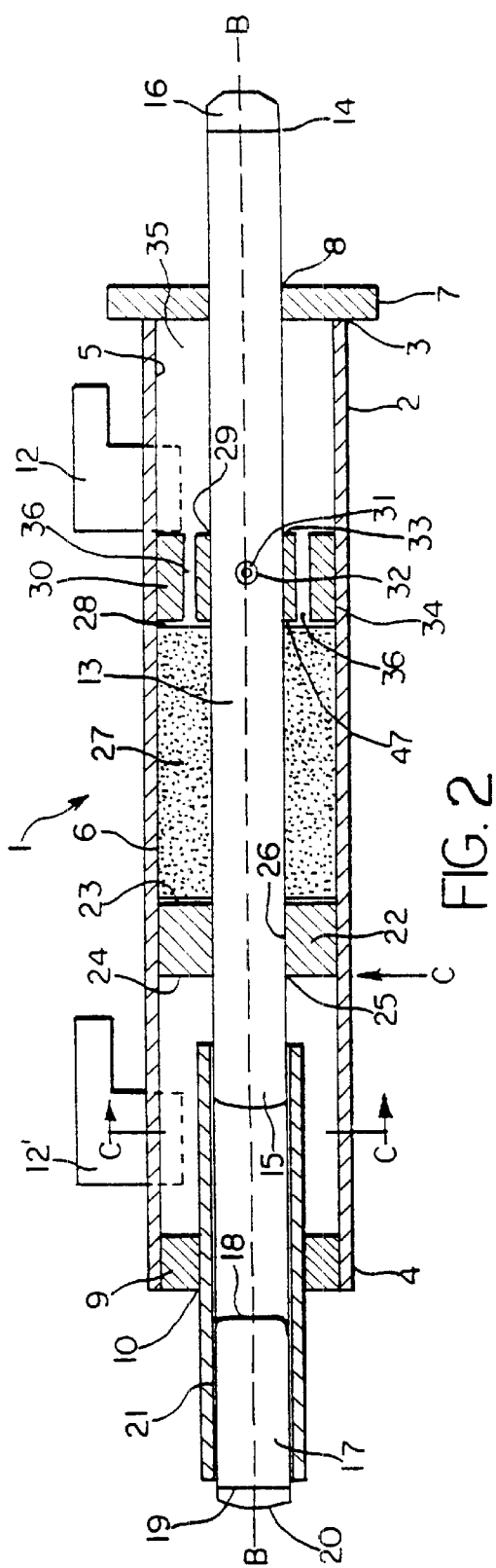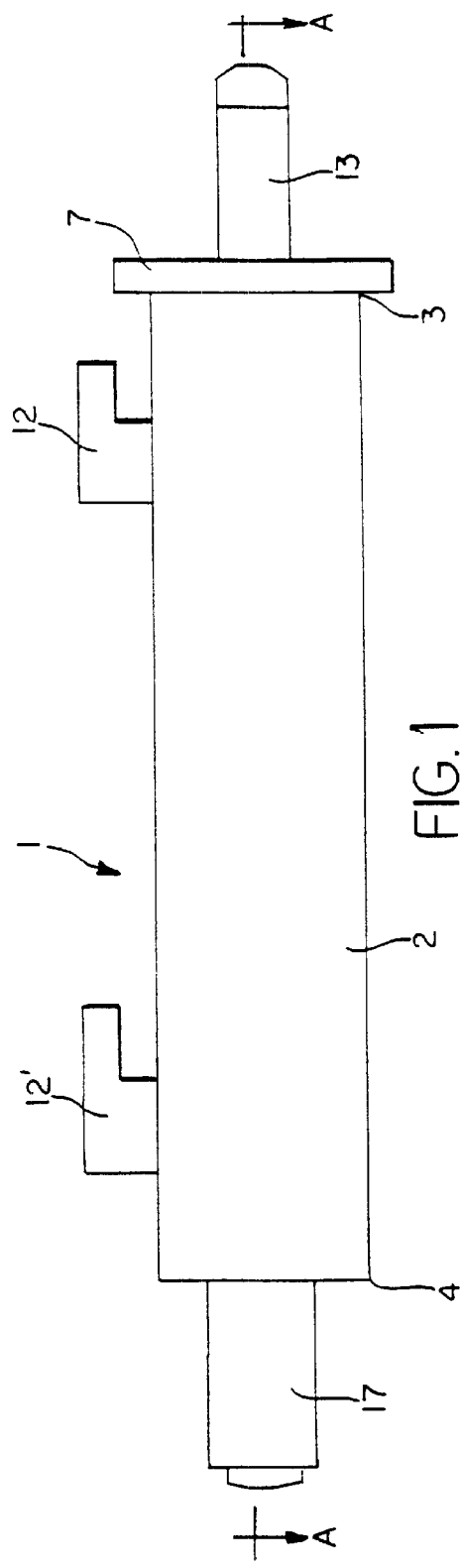

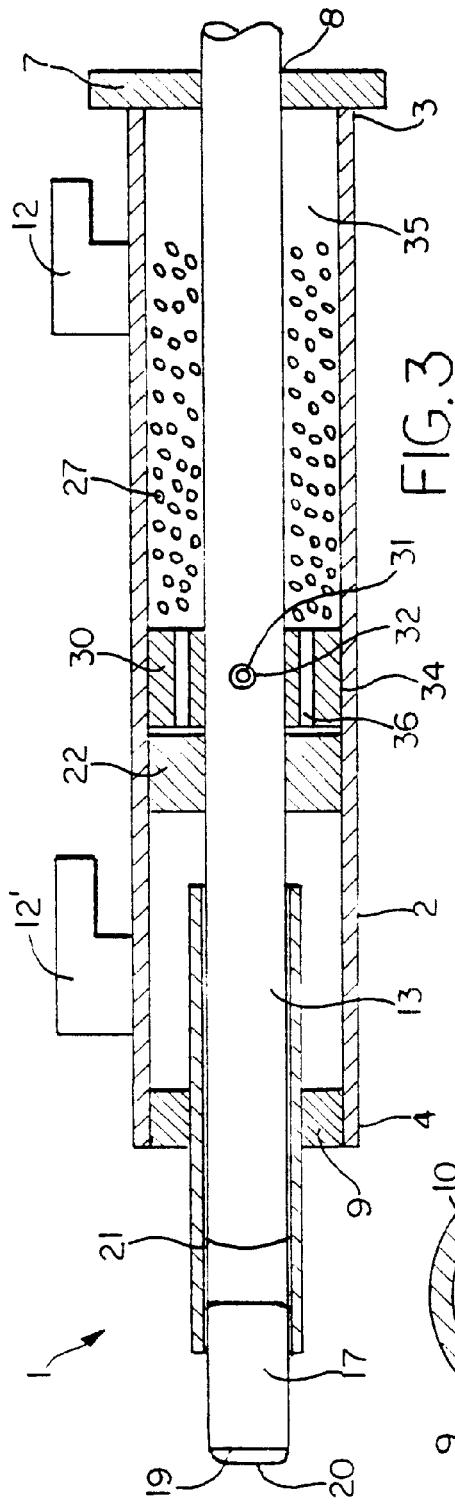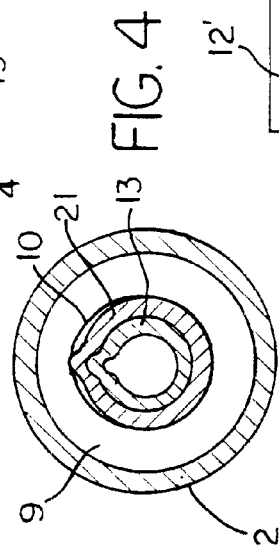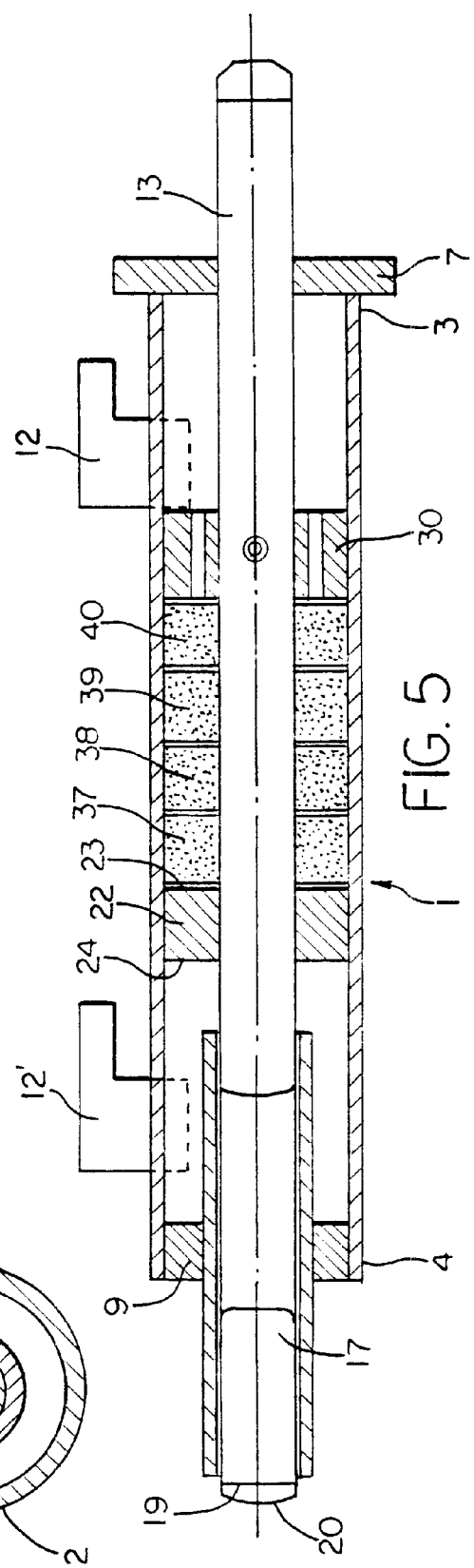

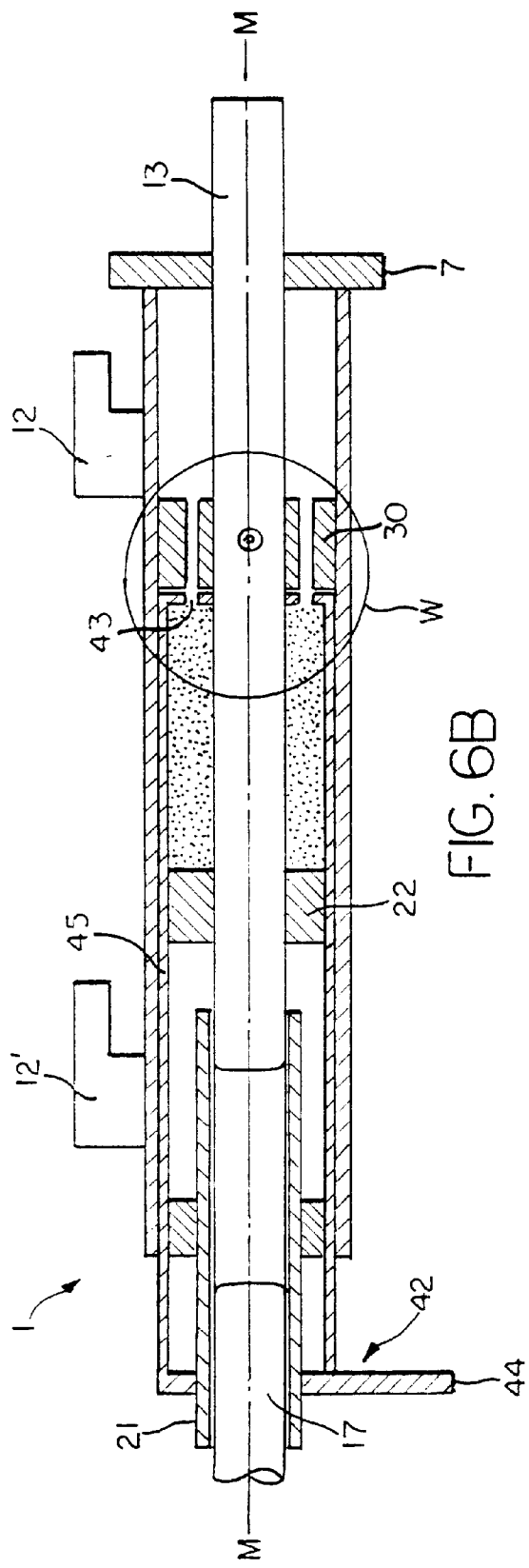
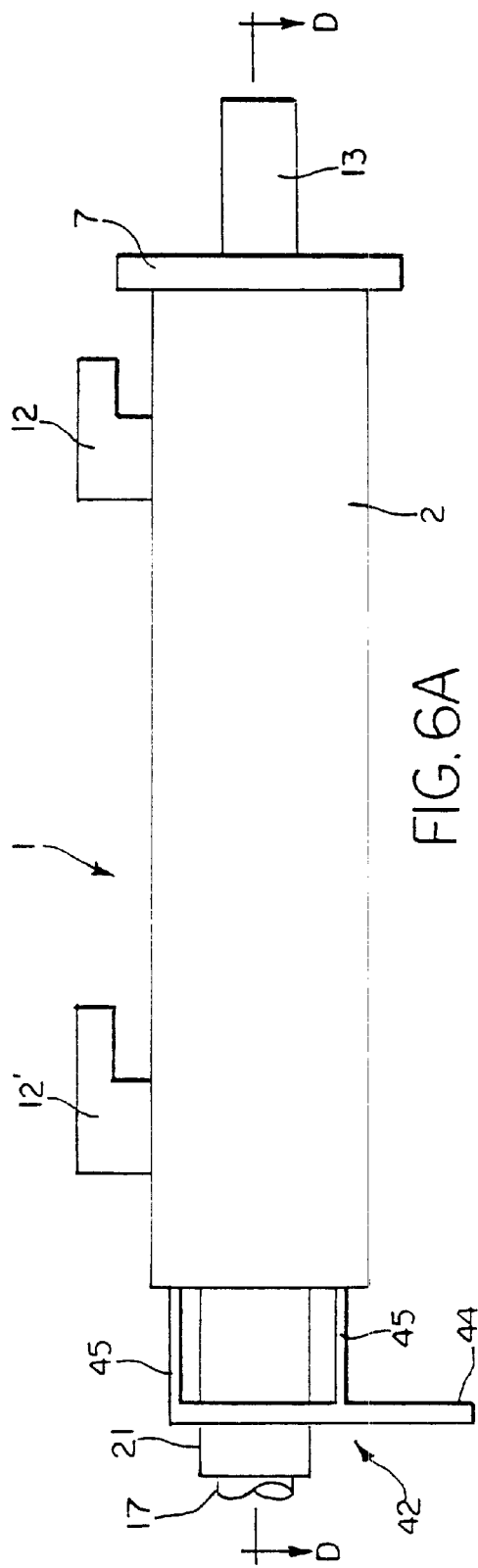
FIG. 6A
FIG. 6B

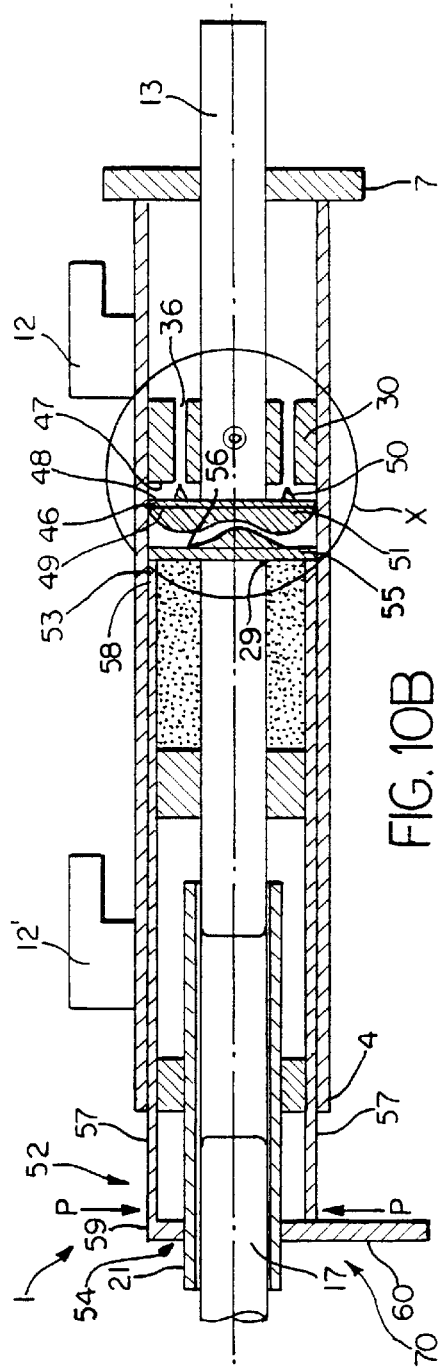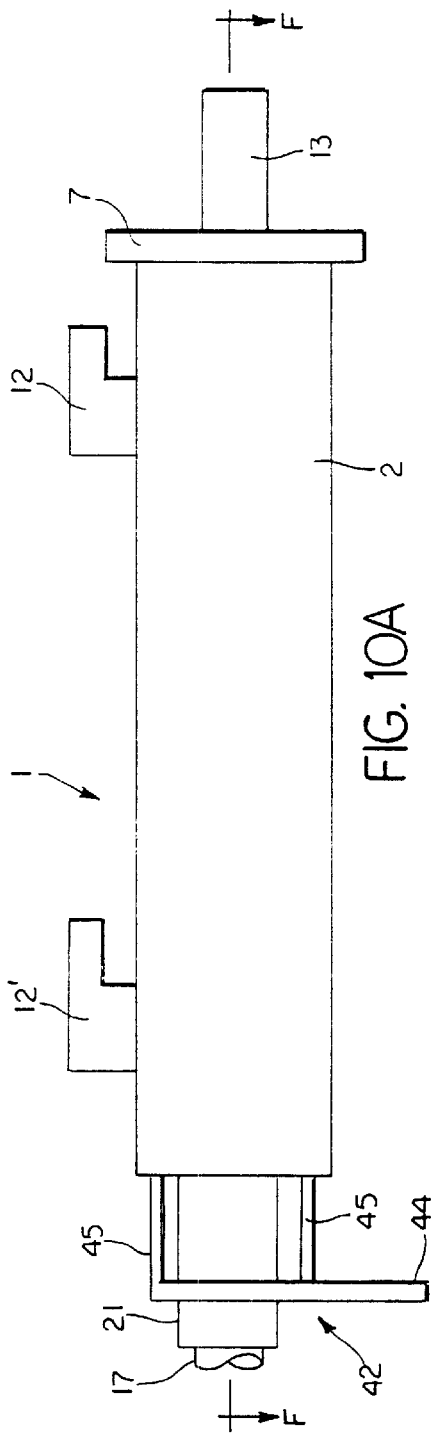

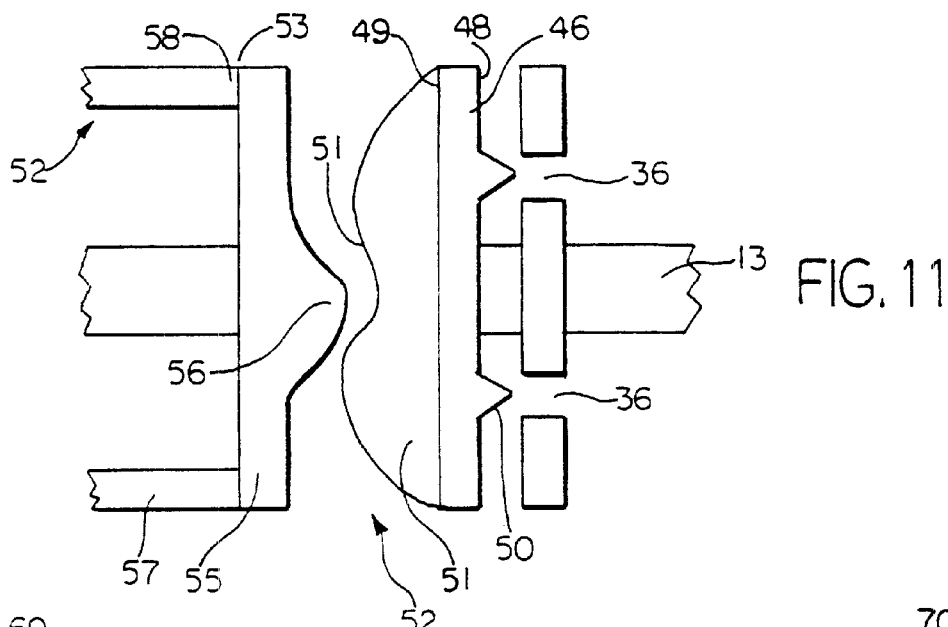
FIG. 11
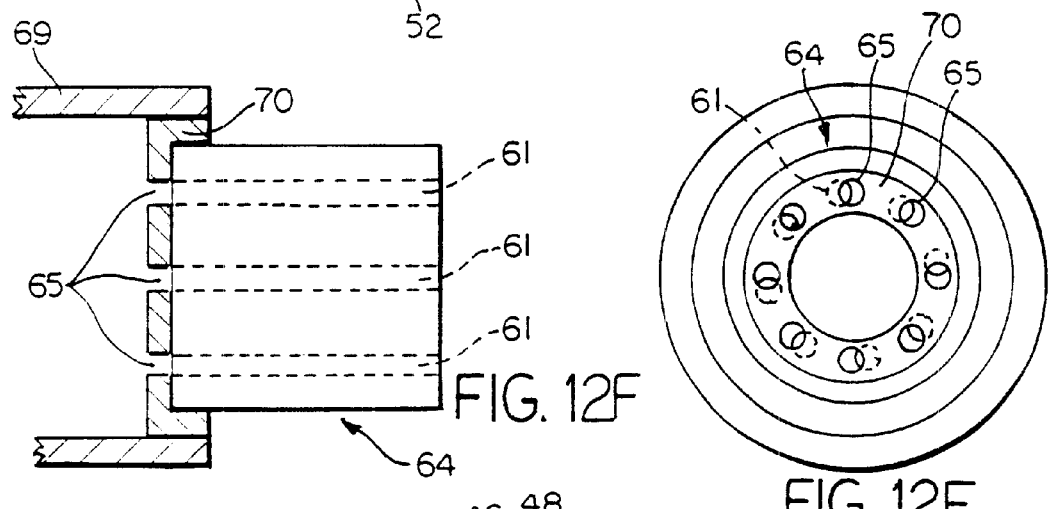
FIG. 12F
FIG. 12E
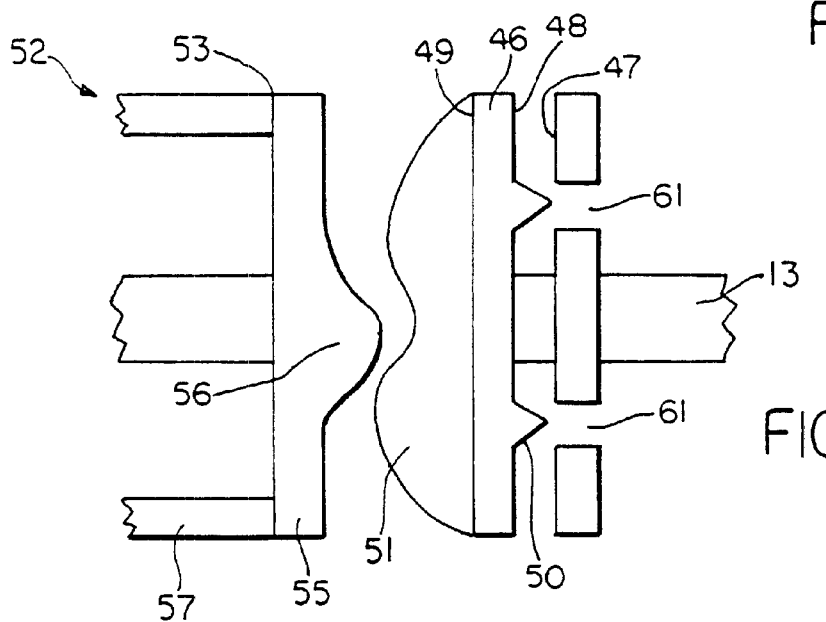
FIG. 15

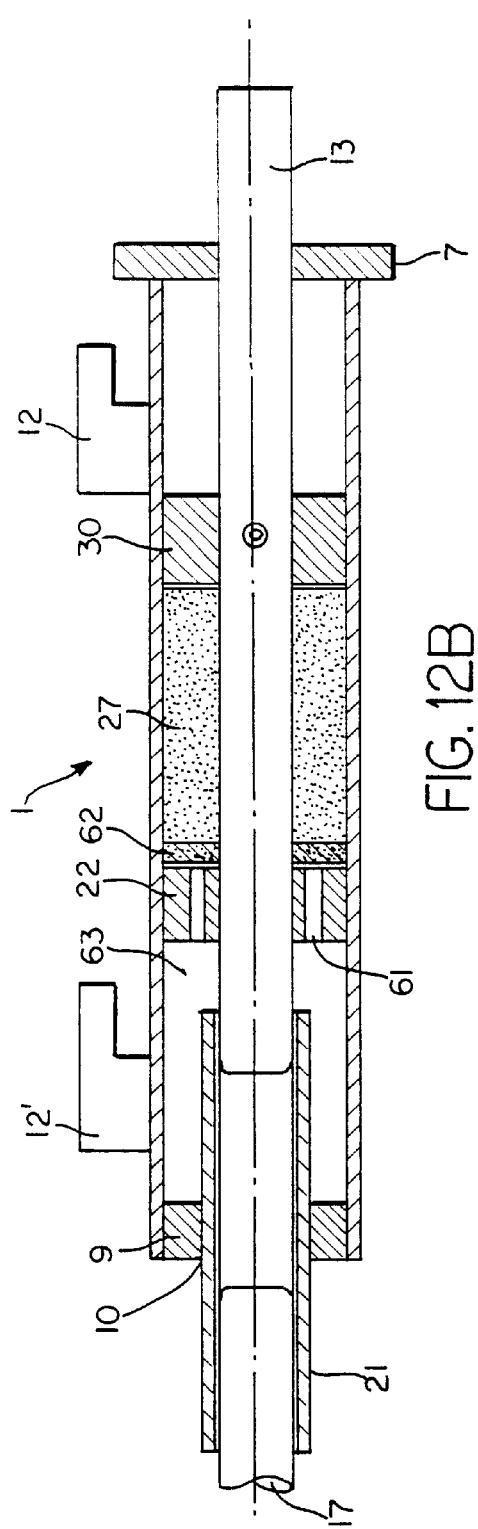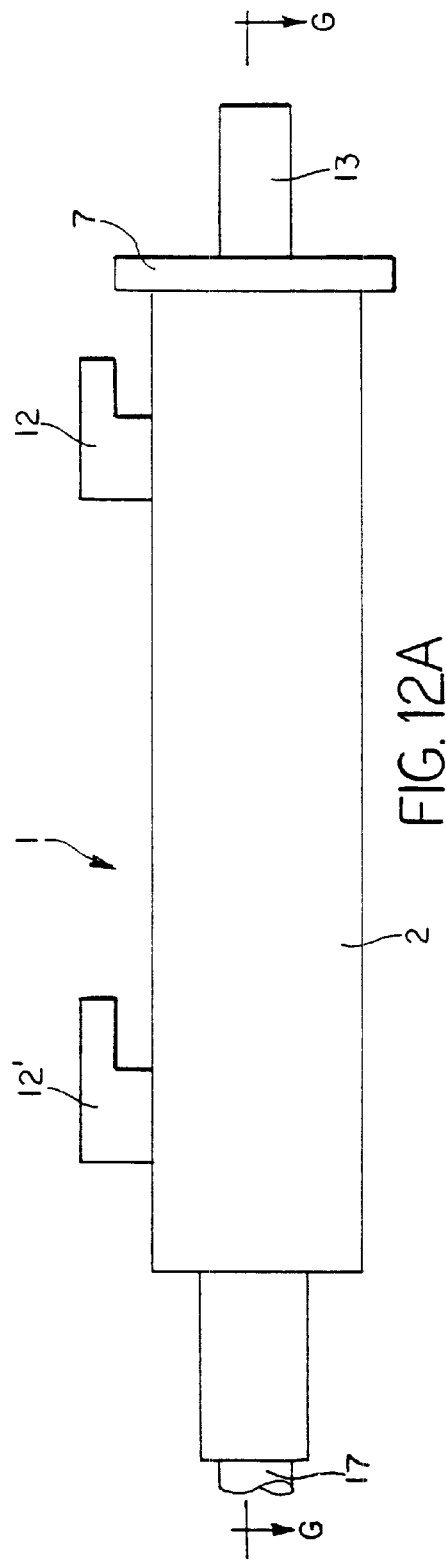
FIG. 12B
FIG. 12A

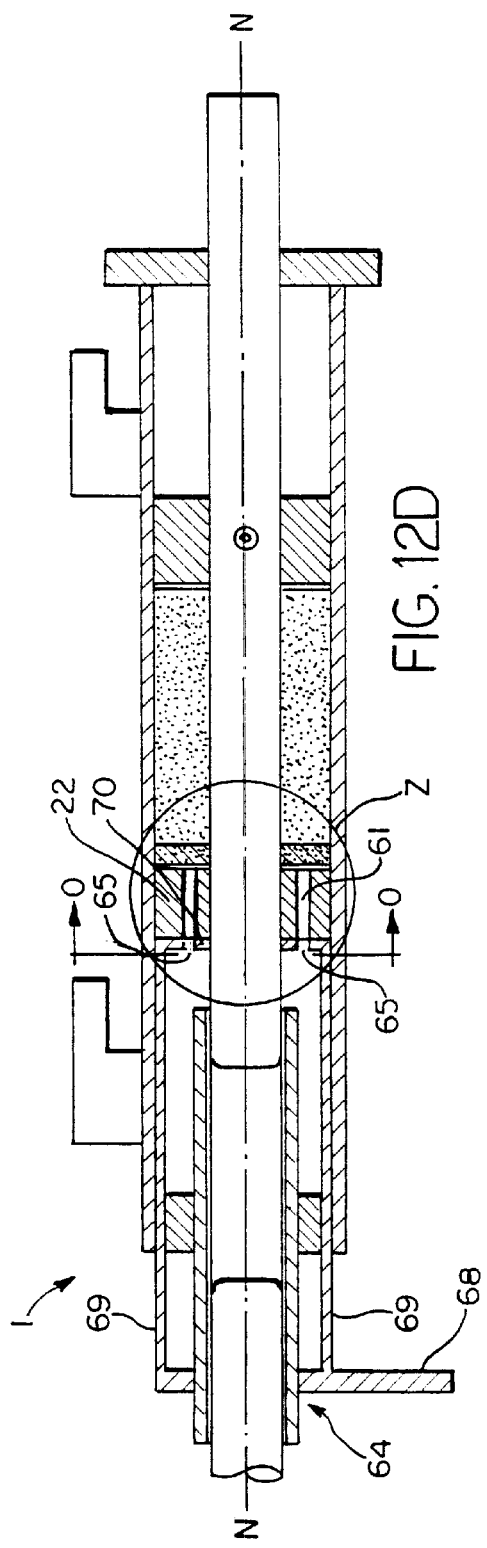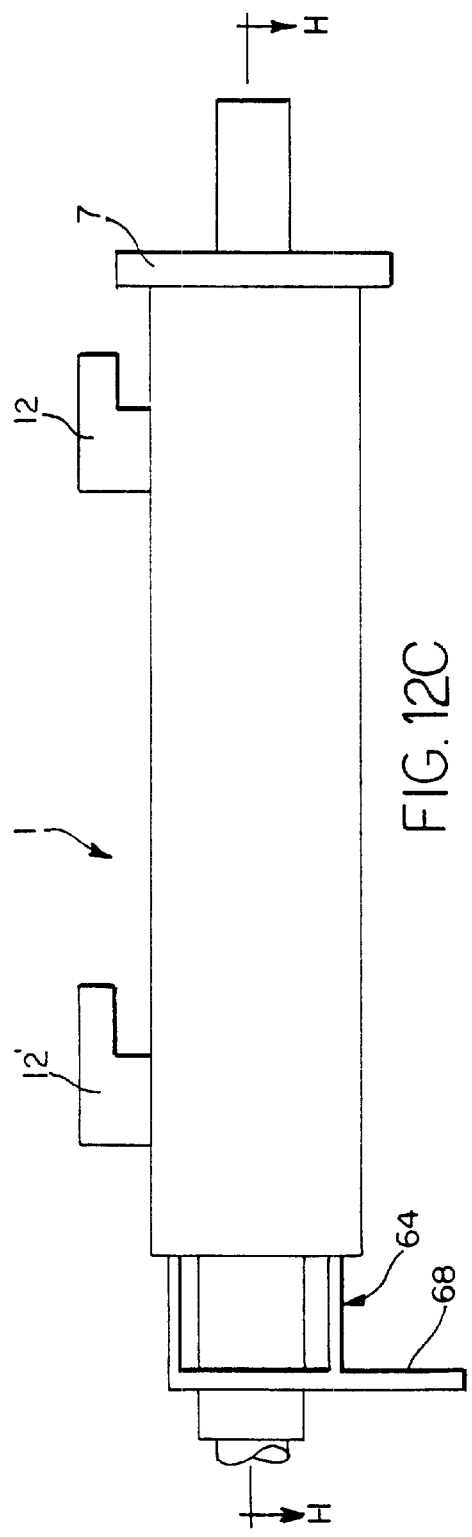
FIG. 12D
FIG. 12C

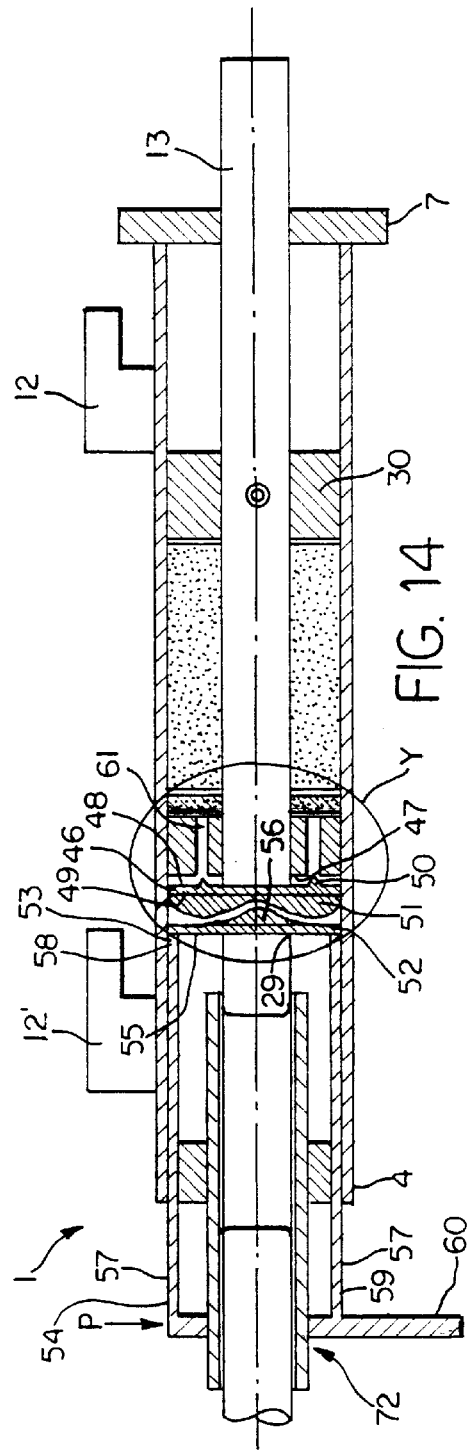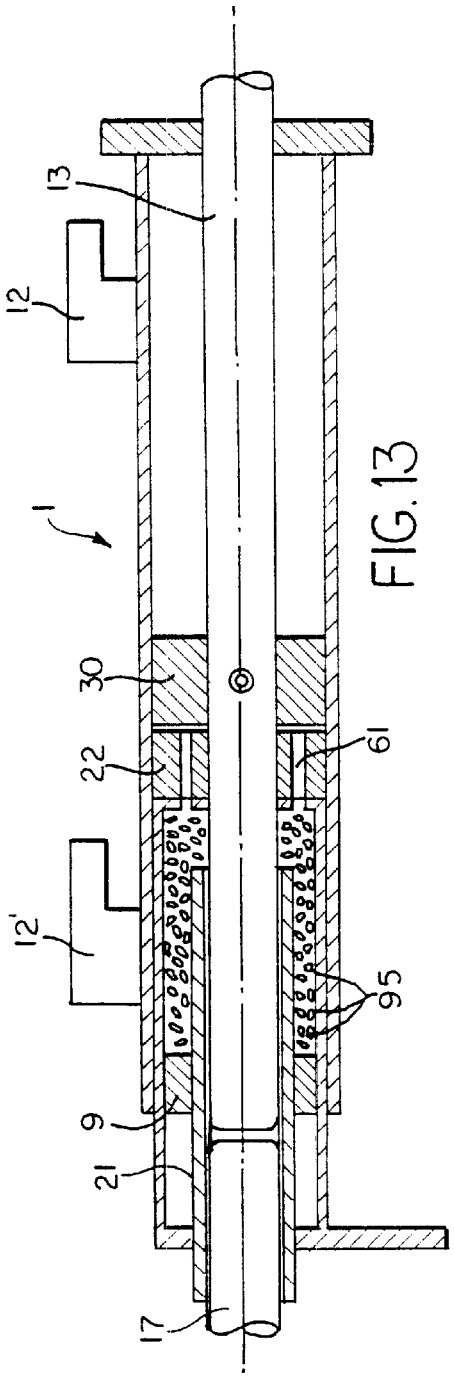

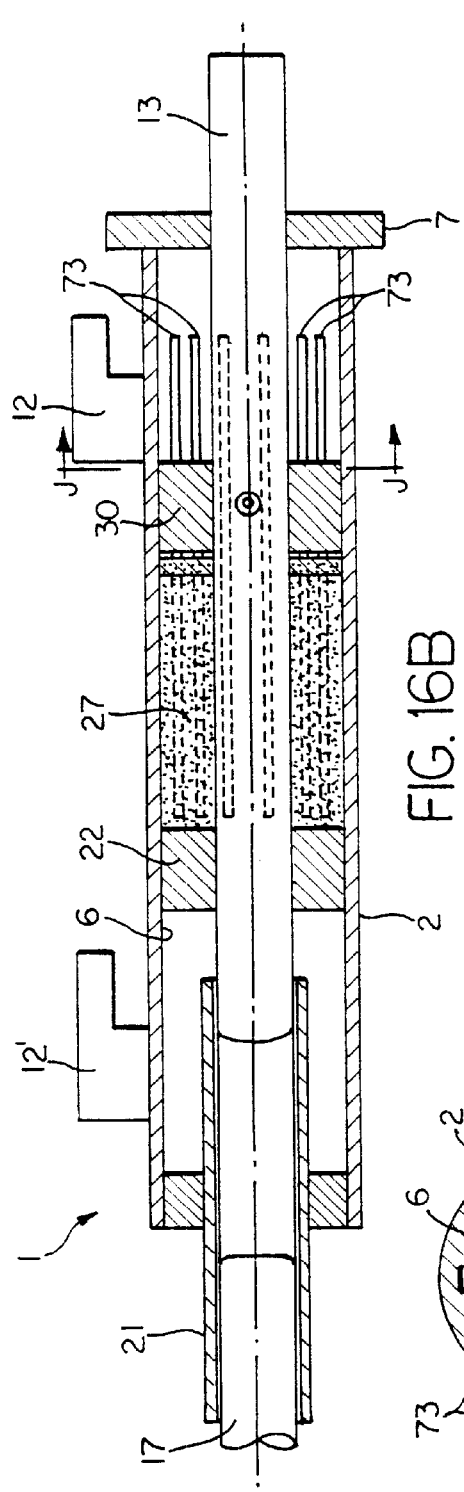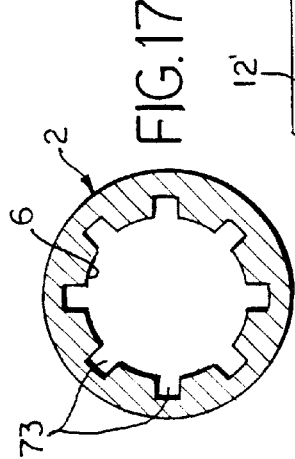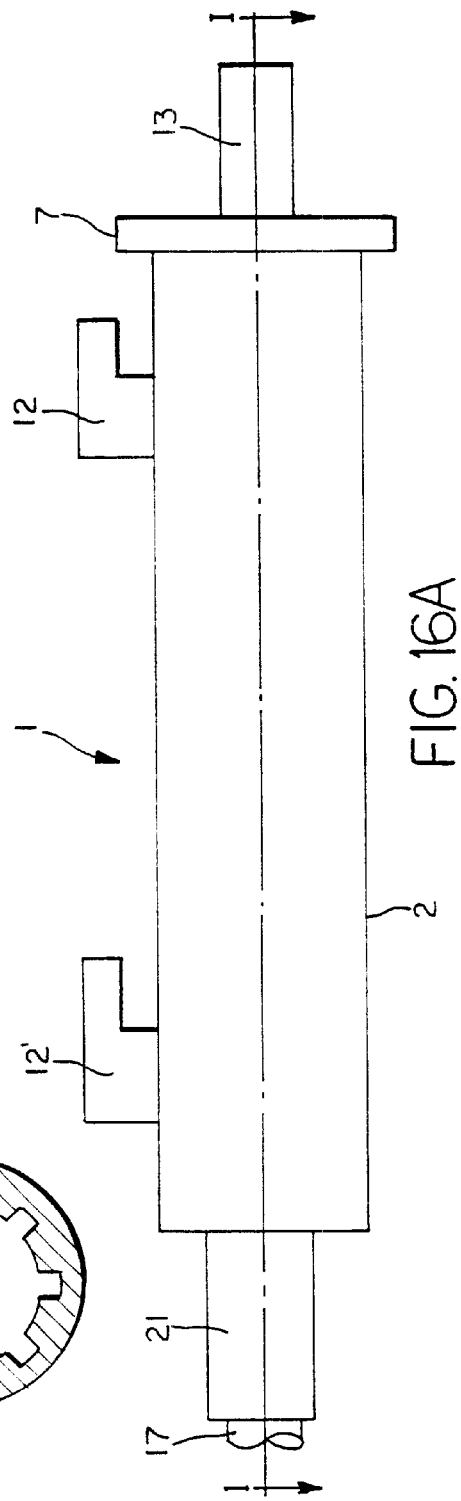

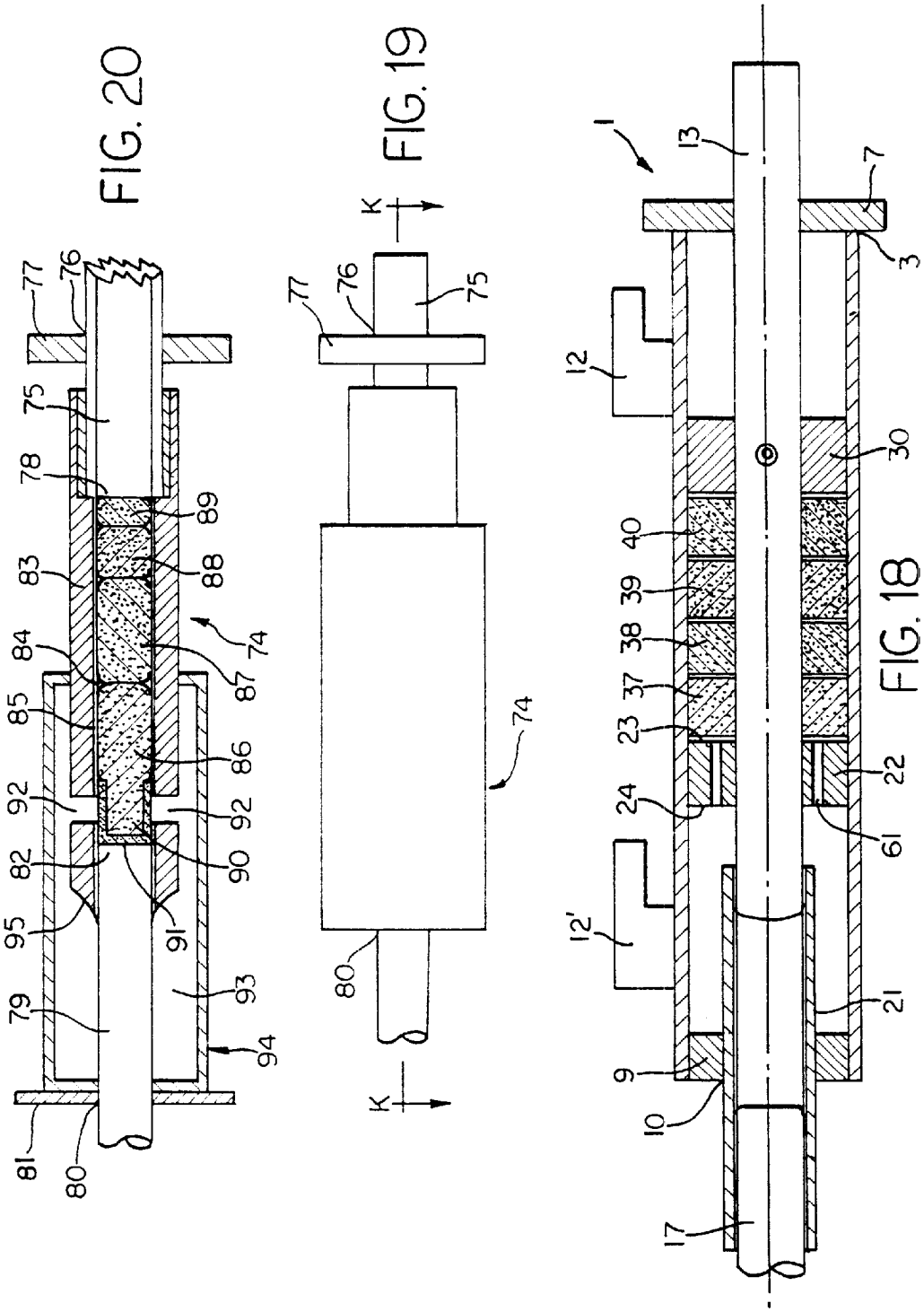

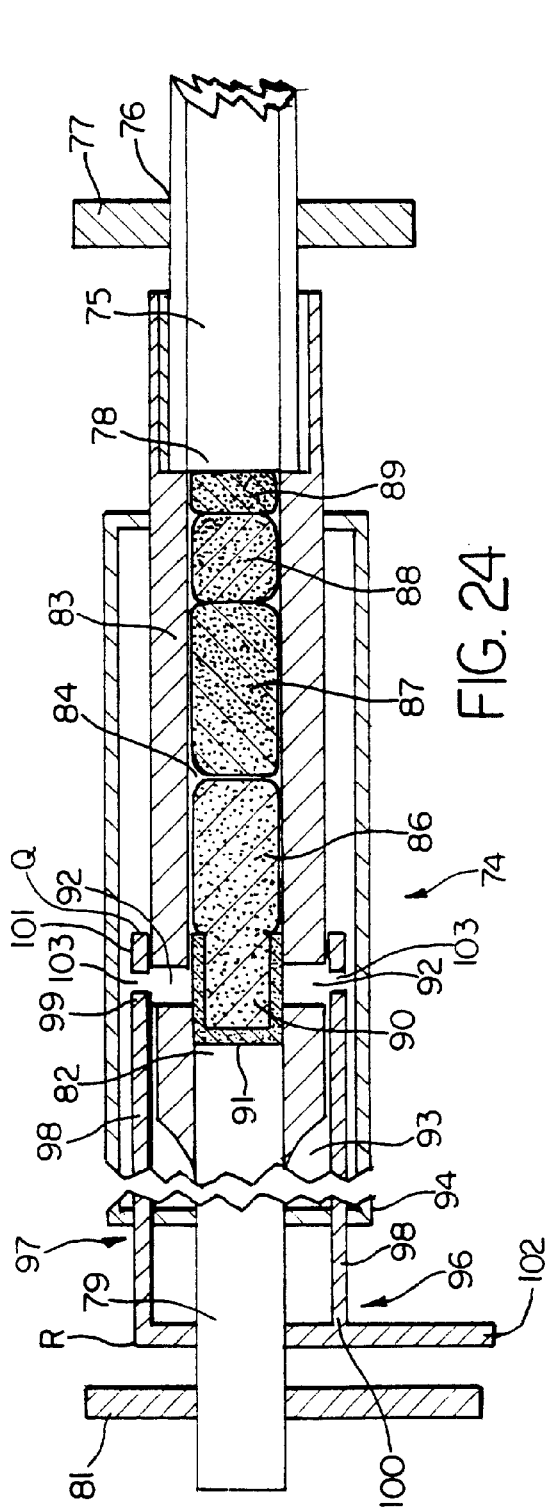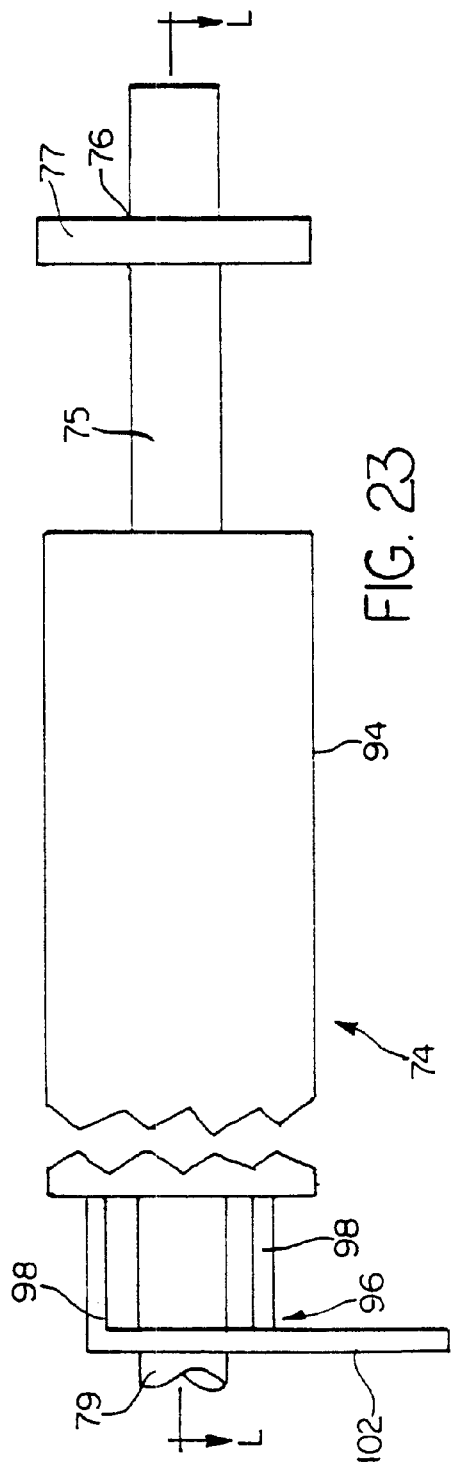

IMPACT SUPPRESSION DEVICES HAVING ENERGY ABSORPTION CAPABILITY

This application is a continuation-in-part of application Ser. No. 09/076,411, filed May 12, 1998, now abandonded.

The invention disclosed and claimed herein deals with impact suppression devices having energy absorbing capability. The devices of this invention utilize a mated spline configuration for two separate shafts that are movably joined such that they can move linearly. In some instances, the shafts themselves can act as a piston, or a piston is used as part of the components. Further, there is used a gel material which has hydraulic fluid properties when a force is applied to it. This gel is sheared in this application, as opposed to just being pushed like a plug of material. Deceleration of the piston or piston-like shaft can be accomplished by the use of various gels having different properties, such as durometer, crosslink density, consistency, chemical composition, additives to the gels, density of the gels, and, by the volume of material or materials in the device providing a predetermined volume per area.

One such device comprises a hollow tube for a housing with shafts protruding from each end. One shaft end is connected to, for example, a steering wheel of a vehicle, while the other end is connected to the mechanism that does the actual steering of the vehicle. Both shafts are movably connected together by means of a mated spline. The spline assures positive rotations of both shafts simultaneously, and also ensures positive rotations of both shafts in the event of an impact. The arrangement also allows the shaft connected to the steering wheel a means of movement within the spline along the axial direction of the shaft. The housing is fixed solidly within the vehicle body frame by some appropriate mounting means that can be brackets, or the like.

BACKGROUND OF THE INVENTION

There are several patents disclosing impact resistant devices. One such patent is U.S. Pat. No. 3,435,700, which issued Apr. 1, 1969 to Calhoun in which there is shown a fluid cushioned vehicle steering apparatus comprising a reservoir, a cylinder having longitudinally spaced apertures formed in it and which is journalled for rotation in the reservoir, and a piston and a piston rod arranged for reciprocation in the cylinder. The damping medium is described as a "fluid". Resistance is provided by a combination of the number of apertures, their location, the size of the apertures and the viscosity of the fluid.

Another patent which discloses an impact resistant device is U.S. Pat. No. 3,454,397, which issued Jul. 8, 1969 to Yoshioka, et al. in which there is shown a steering column constituted by first and second axial shaft portions connected together by a casing containing a plastically deformable material. The plastically deformable material is described at column 2, line 25 as being sponge, styrol, cork or the like.

Yet another patent is U.S. Pat. No. 3,350,737, which issued Sep. 29, 1970 to Higginbotham in which there is disclosed a steering column comprised of two shafts that are connected to two chambers. One of the chambers contains a fluid. The valving operates upon impact with the upper shaft to allow movement of the fluid from one chamber to the other upon the application of pressure. The fluid is described at column 6, line 28, as a "hydraulic fluid".

Still another patent is U.S. Pat. No. 3,656,366, which issued Apr. 18, 1972 to Somero in which a collapsible steering column is disclosed, and which utilizes hydraulic fluid as the dampening medium and, utilizes hexagonal shafts to ensure continued steering in the event of a crash.

U.S. Pat. No. 3,795,390 deals with a shock absorber having a helical coil spring and elastomeric material intermediate of the coils of the coil spring to form a dual spring unit. The interior of the chamber of the device also contains hydraulic fluid.

U.S. Pat. No. 4,674,354, which issued Jun. 23, 1987 to Brand deals with an automobile steering column having a fixed cylindrical housing enclosing a rotatable steering mechanism composed of a pair of telescoping sections joined in a slidable and shock absorbing splined connection.

U.S. Pat. No. 4,019,403, which issued on Apr. 26, 1977 to Kondo, et al, discloses the use of a solid shaft to move shock-absorbing resilient material from a chamber through an orifice which initially is plugged, and upon movement of the solid shaft, the plug is dislodged and the material flows out of the orifice. The shock absorbing material is disclosed as a silicone rubber which is adapted to be ruptured under a given pressure, and which has the desired resiliency and flow resistance. The "silicone rubber" does not appear to be a gel, nor does it appear to have the capability to convert to a crumb rubber upon the application of pressure thereto.

There is a device similar to Kondo, et al, disclosed in U.S. Pat. No. 4,255,986, which issued Mar. 17, 1981 to Mukoyama, in which a similar device is used with the silicone rubber and the exit ports for the material are internal to the housing and through the sidewalls thereof. The essence of the invention in this patent is that the discharge of the silicone rubber into the side chambers where it is contained, prevents the silicone rubber from being discharged into the engine compartment and the silicone rubber is then not subjected to the potential of catching fire.

U.S. Pat. No. 4,463,448, which issued Feb. 17, 1987 to Loren, deals with an energy absorbing steering assembly that employs an elastically deformable plastic foam molded into the cavities between the sleeve and the steering column to absorb energy.

U.S. Pat. No. 5,618,058 that issued on Apr. 8, 1997 to Byon deals with a collapsible steering column apparatus for a motor vehicle in which gas is used as the decelerant.

U.S. Pat. No. 5,482,320 that issued Jan. 9, 1996 to Passebecq deals with a steering column assembly axially retractable in the event of an impact. This assembly uses a force generator that is actuatable upon impact.

Finally, there is disclosed a damping apparatus that utilizes a compressible solid energy absorbing material located in a chamber to absorb energy. Such devices can be found in GB 1,386,645, 1,439,347, and 1,382,131, and U.S. Pat. No. 3,976,287 that issued on Aug. 24, 1976 to Kendall et al. (Menasco Manufacturing Company). According to the disclosure, there is a piston movably mounted within a compressible solid material in a chamber formed within a housing. A piston includes first passages and second passages and the compressible solid material is pushed through the first passages during an extension of the piston, wherein the compressible solid material is also pushed through the second passages during retraction of the piston. There is a ring surrounding the piston, the ring closes off the second passages during extension of the piston and during retraction of the piston the ring moves to permit the compressible solid material to flow back through it. The patent discloses that the typical compressible solid material is conventionally available from Dow Corning Corporation under the trade name of "Silastic".

None of the aforementioned references shows the inventive devices described herein, or the benefits of such devices, the essence of which is described infra.

THE INVENTION

The invention herein deals with impact suppression devices which are useful for energy absorbing applications such as steering columns on automobiles and trucks; front, side, and rear end collision impact resistance on vehicles, and the like.

Therefore, what is disclosed in more detail is an impact suppression device having energy absorbing capability. The device comprises an elongated housing. The elongated housing has a near end, a distal end, an inside surface, and an inside wall. The elongated housing also has an end cap located on the near end thereof, the end cap having a centered aperture therethrough and the end cap being fixed to the elongated housing. The elongated housing has an alignment plug on the distal end thereof, the alignment plug having a centered aperture through it and the alignment plug being fixed into said elongated housing. There is a component that is a means for mounting the elongated housing. Further, there is a component which is a first solid axially aligned straight shaft inserted through and supported in the centered aperture of the end cap. The first solid axially aligned straight shaft has a near end and a distal end and the shaft extends outside of the elongated housing and has a means on the near end for attachment of a steering means, or for attachment to the body of a vehicle, or the like. The solid axially aligned straight shaft is capable of free reciprocal movement in a direction along the solid straight shaft axial alignment. There is a component which is a second solid axially aligned straight shaft inserted through and supported in the centered aperture of the alignment plug, has a near end and a distal end. The second solid axially aligned straight shaft extends outside of the elongated housing and also has means on the distal end for attachment. The distal end of the first solid axially aligned straight shaft and the near end of the second solid axially aligned straight shaft are detachedly joined together in axial alignment by a spline, said first solid axially aligned straight shaft being capable of free reciprocal movement in a direction along the second solid straight shaft axial alignment upon the application of an applied force. Also, both the first solid axially aligned straight shaft and the second solid axially aligned straight shaft are capable of simultaneous rotation by the use of a mating male and female spline on shafts of the first solid axially aligned straight shaft and the second solid axially aligned straight shaft.

There is a component which is a piston stop plug contained within the elongated housing at a point intermediate of the elongated housing distal end and near end. The piston stop plug is fixedly secured to the inside surface of the elongated housing and the piston stop plug has a near side and a distal side. The piston stop plug has a centered aperture therethrough. The first solid, axially aligned straight shaft passes through and is supported by the piston stop plug.

There is a component that is a predetermined volume of a first gel layer capable of being converted from a unitary solid material to a crumb with properties and characteristics of a hydraulic fluid when pressure is applied to it. The first gel is surmounted on the near side of the piston stop plug. The first gel has a predetermined resistance to an applied force upon it.

There is a piston. The piston is mounted on the first solid axially aligned straight shaft and intimately interfaces with the first gel, the piston has a near side and an outside surface, the piston is located on first solid axially aligned straight shaft such that a reservoir is formed on the piston near side thereof defined by the piston, the inside wall, and the end cap of the elongated housing. The piston has at least one communicative opening through it to the reservoir.

It is contemplated within the scope of this invention to use multiple layers of the gels and therefore, disclosed herein is another embodiment of this invention that is an impact suppression device with energy absorbing capability in which the device comprises that described just above wherein the gel components are used in multiple layers.

Therefore, the first gel in that case, is a predetermined volume of a gel capable of being converted from a unitary solid material to a crumb with properties and characteristics of a hydraulic fluid when pressure is applied to it. The first gel is surmounted on the near side of the piston stop plug. The first gel has a predetermined resistance to an applied force upon it, and in addition, there is a predetermined volume of a second gel capable of being converted from a unitary solid material to a crumb with properties and characteristics of a hydraulic fluid when pressure is applied to it. The second gel is surmounted on the first gel, the second gel has a predetermined resistance to an applied force upon it, such resistance being greater than the resistance of the first gel. Moreover, each succeeding gel layer has a lesser or greater resistance than the preceding gel layer with the proviso that if the first gel layer has a greater resistance to force, then all succeeding gel layers have a greater resistance to force than the preceding gel layer, and with the further proviso that if the first gel layer has a lesser resistance to force, then all succeeding gel layers have a lesser resistance to force than the preceding gel layer. It is also contemplated within the scope of this invention to use mixed gel layers of such materials wherein the resistance to force does not necessarily have to be in ascending or descending order, but may be randomly placed.

Another embodiment of the invention disclosed herein is a device which is essentially an impact suppression device with energy absorbing capability comprising all of the components as described above, but wherein there is a means of varying the size of the communicative openings in the piston, the means comprising a plate interfacing intimately with the distal side of the piston, the plate having a centered axis parallel to the first solid axially aligned straight shaft and having a centered aperture for accepting the first solid axially aligned straight shaft through it. The plate has at least one communicative opening that aligns with the communicative openings in the piston. The plate is rotatable around the centered axis by means of a rotatable turning means, said rotatable turning means comprising elongated arms extending from the plate to a point outside of the distal end of the elongated housing. The arms each have a near end and a distal end, the near end being attached to the plate, the distal end being attached to a handle for rotating the rotating means.

There is a further embodiment of the means to vary the size of openings contemplated within the scope of this invention. The further embodiment contemplates the elongated housing, the means for mounting the elongated housing, the first solid axially aligned straight shaft, the second solid axially aligned straight shaft, the piston stop, at least one predetermined gel, the piston, and the reservoir as set forth above, but varies in the additional means of varying the size of the communicative openings in the piston. This means comprises a plate interfacing intimately with the distal side of the piston, the plate having a centered aperture for accepting the first solid axially aligned straight shaft through it. The plate has a centered axis parallel to the first solid axially aligned straight shaft and the plate has a near side and a distal side. The near side has at least one protrusion on the surface thereof and each protrusion is aligned with a communicative opening in the piston. The plate is capable of moving linearly along the first solid axially aligned straight shaft. The distal side of the plate has a cam surface on it. There is a rotatable cam means having a near end and a distal end. The rotatable cam means comprises a cam plate, wherein the cam plate is fixedly mounted on the near end such that the cam on the cam plate mates operatively with the cam surface of the plate on the distal side of the piston. The rotatable cam means comprises elongated arms extending from the cam plate to a point outside of the distal end of the elongated housing. The arms each have a near end and a distal end wherein the near end is attached to the cam plate and the distal end is attached to a handle for rotating the rotatable cam means.

The devices of this invention described thus far have utilized communicative openings through the piston component to allow for the movement of the gels from one position to the other. In the following embodiments, the communicative openings are contained in the piston stop plug.

Thus, further contemplated within the scope of this invention is an impact suppression device having energy absorbing capability comprising an elongated housing, the elongated housing having a near end, a distal end, an inside surface, and an inside wall. The elongated housing has an end cap located on the near end and the end cap has a centered aperture through it and the end cap is fixed to the elongated housing. The elongated housing further has an alignment plug on the distal end and the alignment plug has a centered aperture through it. The alignment plug is fixed into the elongated housing. There is a means for mounting the elongated housing while the first solid axially aligned straight shaft is inserted through and supported in the centered aperture of the end cap. The solid axially aligned straight shaft has a near end and a distal end and the first solid axially aligned straight shaft extends outside of the elongated housing and has means on the near end for attachment. The solid axially aligned straight shaft is capable of free reciprocal movement in a direction along the solid straight shaft axial alignment upon the application of a force.

The second solid axially aligned straight shaft is inserted through and supported in the centered aperture of the alignment plug. The second solid axially aligned straight shaft has a near end and a distal end. The second solid axially aligned straight shaft extends outside of the elongated housing and has means on the distal end for attachment. The distal end of the first solid axially aligned straight shaft and the near end of the second solid axially aligned straight shaft being detachedly joined together in axial alignment. The second solid axially aligned straight shaft is incapable of free reciprocal movement in a direction along the second solid straight shaft axial alignment. The first solid axially aligned straight shaft and the second solid axially aligned straight shaft are capable of simultaneous rotation by the use of a mating male and female spline on the shafts of the first solid axially aligned straight shaft and the second solid axially aligned straight shaft.

There is a piston stop plug contained within the elongated housing at a point intermediate of the elongated housing distal end and near end. The piston stop plug is fixedly secured to the inside surface of the elongated housing. The piston stop plug has a centered aperture through it. The piston stop plug has a near side and a distal side and the piston stop plug is located such that a reservoir is formed on the piston stop plug distal side thereof defined by the piston stop plug, the inside wall, and the alignment plug of the elongated housing. The piston stop plug has at least one communicative opening through it, opening from the containment area for the piston stop plug to the reservoir, the first solid, axially aligned straight shaft passing through and being supported by said piston stop plug.

There is a predetermined volume of a first gel capable of being converted from a unitary solid material to a crumb with properties and characteristics of a hydraulic fluid when pressure is applied to it. The first gel is surmounted in a containment area on the near side of the piston stop plug, the first gel having a predetermined resistance to an applied force upon it.

A piston is mounted on the first solid axially aligned straight shaft and intimately interfacing with the first gel.

The embodiment described just supra also has the capability of operating through a variation of the openings. These embodiments vary from that described just above by such means which is a component, which is a means of varying the size of the communicative openings in the piston stop plug. The means comprises a plate interfacing intimately with the distal side of the piston stop plug. The plate has a centered axis parallel to the first solid axially aligned straight shaft and has a plate having a centered aperture for accepting the first solid axially aligned straight shaft through it. The plate has at least one communicative opening that aligns with the communicative openings in the piston stop plug. The plate is rotatable around the centered axis by means of a rotatable turning means, the rotatable turning means comprises elongated arms extending from the plate to a point outside of the distal end of the elongated housing, said arms having a near end and a distal end, the near end being attached to the plate, the distal end being attached to a handle for rotating the rotating means.

There is a predetermined volume of a first gel capable of being converted from a unitary solid material to a crumb with properties and characteristics of a hydraulic fluid when pressure is applied to it. The first gel is surmounted on the near side of the piston stop plug, the first gel having a predetermined resistance to an applied force upon it. There is an additional component that is a piston. The piston is mounted on the first solid axially aligned straight shaft and intimately interfacing with the first gel.

Likewise, another method of varying the size in this embodiment is that found by a means of varying the size of the communicative openings in the piston stop plug wherein the means comprises a plate interfacing intimately with the distal side of the first gel. The plate has a centered aperture for accepting the first solid axially aligned straight shaft through it. The plate has a centered axis parallel to the first solid axially aligned straight shaft and the plate has a near side and a distal side. The near side has at least one protrusion on the surface thereof, each said protrusion being aligned with a communicative opening in the piston stop plug. The plate is capable of moving linearly along the first solid axially aligned straight shaft, and the distal side of the plate has a cam surface on it.

There is a rotatable cam means that has a near end and a distal end, wherein the rotatable cam means comprises a cam plate. The cam plate is fixedly mounted on the near end such that the cam on the cam plate mates operatively with the cam surface on the distal side of the piston. The rotatable cam means comprises elongated arms extending from the cam plate to a point outside of the distal end of the elongated housing, said arms having a near end and a distal end, the near end being attached to the cam plate, the distal end being attached to a handle for rotating the rotatable cam means. As above, there is also included a piston. The piston is mounted on the first solid axially aligned straight shaft and intimately interfaces with the rotatable cam means.

There is yet another embodiment of the means for moving the gel from the containment area to a reservoir and such means is one in which the elongated housing has at least one channel in the inside surface thereof, which channel provides a communication between the first gel and the reservoir.

Finally, it is contemplated within the scope of this invention that one skilled in the art can use a combination of channels in the inside walls of the elongated housing and the communicative openings in either of the piston or piston stop plug.

BRIEF DESCRIPTION OF THE DRAWINGS

FIG. 1 is a full side view of one device of this invention.

FIG. 2 is a cross sectional view of the device of FIG. 1 through the line A—A, illustrating communicative openings in the piston and a single layer of gel.

FIG. 3 is a cross-sectional view of the device through line A—A of FIG. 1 after the device has gone through an impact.

FIG. 4 is a cross-sectional view of the device through line C—C of FIG. 2.

FIG. 5 is a cross-sectional view of another embodiment of this invention taken through line A—A of FIG. 1, showing communicative openings in the piston and multiple layers of gel.

FIG. 6A is a full side view of another embodiment of this invention.

FIG. 6B is a cross-sectional view of the device through line D—D of FIG. 6A showing the internal mechanism of the device for varying the size of the communicative openings in the piston.

FIG. 10A is a full side view of another device of this invention.

FIG. 10B is a full cross-sectional view of FIG. 10A through line F—F showing the internal parts of the mechanism for varying the size of the openings in the piston.

FIG. 11 is an enlargement of the section within the area proscribed by the circle X of FIG. 10B.

FIG. 12A is a full side view of another embodiment of the device of this invention.

FIG. 12B is a cross-sectional view of the device of FIG. 12A through line G—G showing the communicative openings through the piston stop plug.

FIG. 12C is a full side view of another embodiment of the device of this invention.

FIG. 12D is a cross-sectional view of FIG. 12C through line H—H wherein the communicative openings are through the piston stop plug, and there is present a mechanism for varying the size of the communicative openings.

FIG. 12E is a cross-sectional end view of FIG. 12D through line O—O.

FIG. 12F is an enlarged side view of the area Z of FIG. 12D.

FIG. 13 is a cross-sectional view through line H—H of FIG. 12A showing the device after impact.

FIG. 14 is a cross-sectional view through line H—H of FIG. 12C showing yet another embodiment of a mechanism for varying the size of the communicative openings in the piston stop plug.

FIG. 15 is an enlarged view of the area proscribed by the area Y of FIG. 14 showing the details of the mechanism for varying the size of the communicative openings in the piston stop plug.

FIG. 16A is a full side view of another embodiment of this invention.

FIG. 16B is a cross-sectional view of FIG. 16A through line I—I.

FIG. 17 is a cross-sectional view of FIG. 16B through line J—J showing the channels in the inside surface of the elongated housing.

FIG. 18 is a cross-sectional view of FIG. 12A through line G—G, except that the gel is shown in several layers.

FIG. 19 is a full side view of another embodiment of the device of this invention showing a reservoir for the gel.

FIG. 20 is a cross-sectional view of FIG. 19 through line K—K.

FIG. 23 shows a fragmented figure of another embodiment of a device of this invention.

FIG. 24 is a cross-sectional view of FIG. 23 through line L—L showing the internal structure of the device.

DETAILED DESCRIPTION OF THE INVENTION

Figure 6C:
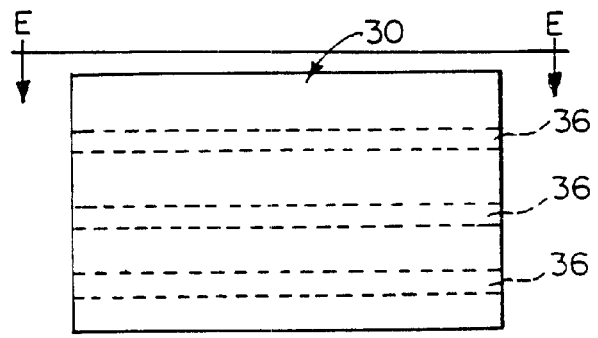
FIG. 6C is a full side view of the piston of FIG. 6B, showing some of the communicative openings in phantom.

There is provided an impact suppression device that has energy absorbing capabilities. Examples of the materials that are useful in such devices are can be found in, for example, U.S. Pat. No. 3,843,601, issued Oct. 22, 1974 to Bruner in which there is described a silicone elastomer that flows like a fluid under high pressure. It converts to a powder (crumb) under high shear stress, but has the unique property of flowing like a viscous fluid through a narrow orifice.

A second patent is U.S. Pat. No. 4,670,530, which issued Jun. 2, 1987 to Beck. This patent deals with a silicone rubber that is a crumb and which has an extrusion rate of at least 50 grams per minute through an orifice of 0.5 inches diameter under a pressure of 345 kilopascals and compression points of less than 1035 kilopascals.

Yet another patent is U.S. Pat. No. 4,686,271 which issued Aug. 11, 1987 to Beck et al in which a fine particulate form of a silicone crumb is disclosed and finally, U.S. Pat. No. 4,973,642, that issued Nov. 27, 1990 to Donatelli et al discloses a silicone crumb rubber which is useful in the instant invention.

The devices of the instant invention provide an opportunity to vary the deceleration of the shafts of the device as opposed to the prior art devices which are designed to provide energy absorption at a given speed of impact without any allowance being made for greater speeds.

Now, with reference to FIGS. 1 and 2 wherein FIG. 1 is a full side view of a device 1 of this invention and FIG. 2 is a cross-sectional view of FIG. 1 through the lines A—A, there is provided an impact suppression device 1 of this invention which comprises an elongated housing 2. The elongated housing 2 has a near end 3, a distal end 4, an inside surface 5 and an inside wall 6. The elongated housing 1 also has an end cap 7, which is located on the near end 3. The end cap 7 has a centered aperture 8 through it and the end cap 7 is fixed to the elongated housing 1 in a stable fashion.

The elongated housing 2 has an alignment plug 9 on the distal end 4. The alignment plug 9 has a centered aperture 10 through it.

The elongated housing 2 has a means 12 and 12' for mounting the device 1 within a vehicle body frame as a steering column, such as an automobile. The means for mounting the devices of this invention are not critical, and therefore, any means which fixedly attaches the device and stabilizes it is sufficient, for example, the devices of this invention when used within the vehicle body frame are attached directly to the body frame by welding, bolting, or some other such means by which the device is maintained in a fixed, stable position. The elongated housing 2 of this invention does not have to have any particular outside configuration. For example, the elongated housing 2 can be round, polygonal, rectangular, or square in configuration, as long as such configuration does not interfere with the action of the device, such as the ability to move reciprocally along the axis of the shafts due to a force applied thereto, as will be discussed in detail infra.

Within the working components of the device 1, there is shown a first solid axially aligned straight shaft 13, which is inserted through and supported in the centered aperture 8 of the end cap 7. The first solid axially aligned straight shaft 13 is capable of rotation in either direction within the aperture 8. The first solid axially aligned straight shaft 13 has a near end 14 and a distal end 15, and the first solid axially aligned straight shaft 13 extends outside of the elongated housing 2 and terminates outside of the elongated housing 2 at near end 14. The first solid axially aligned straight shaft 13 has a means 16 on it for attaching the first solid axially aligned straight shaft 13 to, for example, a steering wheel of an automobile (not shown), or it can have means for attaching the first shaft 13 within the confines of an automobile, for example within a fender or inside the hood of a vehicle, or between the automobile bumper and the automobile frame, such attachment being preferred on the body frame of the vehicle for strength and stabilization.

The first solid axially aligned shaft 13 is capable of free reciprocal movement in a direction along the first solid straight shaft axial alignment shown as line B—B, upon the application of a force thereto.

There is a second solid axially aligned straight shaft 17 inserted through and supported in the centered aperture 10 of the alignment plug 9. The second solid axially aligned straight shaft 17 has a near end 18 and a distal end 19. The second solid axially aligned straight shaft 17 extends outside of the elongated housing 2 and terminates at its distal end 19 wherein it has a means 20 for attaching the second solid axially aligned straight shaft 17 to, for example, a steering mechanism for steering a vehicle, such as a rack and pinion (not shown). The distal end 15 of the first solid axially aligned shaft 13, and the near end 18 of the second solid axially aligned shaft 17 are detachedly joined together in axial alignment along axis B—B such that the first solid axially aligned straight shaft 13 is capable of free reciprocal movement in a direction along the line B—B upon the application of force thereto, the second solid axially aligned straight shaft 17 being incapable of reciprocal movement along the line B—B. The male and mating female spline 21 ensures that the first solid axially aligned straight shaft 13 and the second solid axially aligned straight shaft 17 are capable of simultaneous rotation in either direction around axis B—B, even if the device 1 has been subjected to an impact.

A piston stop plug 22 is contained within the elongated housing 2 at a point C essentially intermediate of the elongated housing 2 distal end 4 and near end 3. The piston stop plug 22 is fixedly secured to the inside surface 5 of the elongated housing 2 and the piston stop plug 22 has a near side 23 and a distal side 24. The piston stop plug 22 has a centered aperture 25 through it.

The first solid axially aligned straight shaft 13 passes through and is supported by the piston stop plug 22, and the first solid axially aligned straight shaft 13 has the capability of rotating on the surface 26, around the axis B—B, in either direction.

There is a solid elastomeric gel 27, which is capable of being converted from a unitary solid material to a crumb with properties and characteristics of a hydraulic fluid when pressure is applied to it. It is located in the chamber 28 formed by the piston stop plug 22, the inside wall 6, and the piston 30, described in detail infra. The gel 27 has a predetermined resistance to an applied force on it that can be determined by the weight of the occupant of the car, the speed of the vehicle, or a combination of these two factors.

There is a piston 30, fixedly mounted on the first solid axially aligned straight shaft 13, such that the first solid axially aligned straight shaft 13 passes through the piston 30 through the center aperture 29. The first solid axially aligned straight shaft 13 is securely fixed to the piston 30 by the use of a pin 31, through aperture 32, which passes through both the first solid axially aligned straight shaft 13 and the piston 30. The piston is situated such that it intimately interfaces with 27, although any means for attaching the piston 30 to the shaft 13 is acceptable for this invention, as long as the attachment is secure. For example, the piston can be glued into the mated spline wherein the glue is of the type that is capable of being sheared upon the application of sufficient force.

The piston 30 has a near side 33 and an outside surface 34 and the piston is located such that a reservoir 35 is formed on the piston near side 33 which is defined by the piston 30, the inside wall 6, and the end cap 7 of the elongated housing 2. The piston 30 has at least one communicative opening 36 from the gel 27 to the reservoir 35.

When the device 1 is in normal use as a steering column for a vehicle, for example, the spline 21 allows for the rotation of the first solid axially aligned straight shaft 13 and the second solid axially aligned straight shaft 17 simultaneously. Upon impact, the first solid axially aligned straight shaft 13 moves toward the second solid axially aligned straight shaft 17, carrying with it piston 30, which impacts the gel 27, and forces it to move through the openings 36 into the chamber 35, while at the same time, the spline 21 allows for the continued control of the rotation of the first solid axially aligned straight shaft 13 and the second solid axially aligned straight shaft 17 simultaneously. The movement of the first solid axially aligned straight shaft 13 to contact the gel 27 allows for smooth deceleration of the first solid axially aligned straight shaft 13 as the gel 27 moves through the openings 36 into the reservoir 35, and thereby decelerates the movement of any person situated at the distal end 14 of the first solid axially aligned straight shaft 13, while at the same time, the gel 27 absorbs energy and decreases the force provided by the force applied for axial movement of the first solid axially aligned straight shaft 13.

FIG. 3, wherein like numbers indicate like components, there is shown the device 1 after it has been affected by an impact. As can be observed, the gel 27 is now located in the reservoir 35, and is in crumb form, and FIG. 4 is a cross-sectional view of the device 1 through the line C—C of FIG. 2 to show the arrangement of the elongated housing 2, the alignment plug 9, the aperture 10, the spline 21, and the first solid axially aligned straight shaft 13, with regard to each other.

Turning now to another embodiment of this invention, and with reference to FIG. 5, which is a full cross-sectional side view of FIG. 1 through line A—A except that instead of just one layer of gel, there is shown several layers of gel. Thus, with reference to FIG. 5, wherein like numbers indicate like components as in FIGS. 1 and 2, there is shown a series of gel layers beginning with gel layer 37. Each of the gel layers, 37, 38, 39, and 40 have a different resistance. Each of layers 37, 38, 39, and 40 are gels capable of being converted from a unitary solid material to a crumb with properties and characteristics of a hydraulic fluid when pressure is applied to it. By way of an example to illustrate the invention, the gel 37 is surmounted on the near side 23 of the piston stop plug 22. The gels 37 to 40 all have a predetermined resistance to an applied force upon them. There is surmounted on gel 37, a second gel 38 having essentially the characteristics of gel 37, but its resistance is lesser than that of gel 37. Surmounted on gel 38 is gel 39 that has essentially the characteristics of gels 37 and 38, except that its resistance is lesser than that of gel 38. Finally, surmounted on gel 39 is a gel 40 having essentially the characteristics of gels 37, 38, and 39, but its resistance is lesser than that of gel 39. Thus, when a force is applied to the first shaft 13, which causes the piston 30 to move into the gels, gel 40, with the least resistance of all of the gels provides a modicum of resistance to the applied force. As the piston moves through the gels, the resistance to the applied force is greater, and through this means, the first solid axially aligned straight shaft 13 is slowed in its forward motion, the energy that was applied to move the first solid axially aligned shaft 13 is also slowly abated until the piston 30 comes to rest on or near the piston plug stop 22. Contemplated within the scope of this invention is the reverse order of layers of gels 37 to 40, such that the greater resistance gel is provided next to the piston 30, and the resistance of the each of the succeeding gel layers thereafter is lesser than the gel proceeding it.

Figure 26:
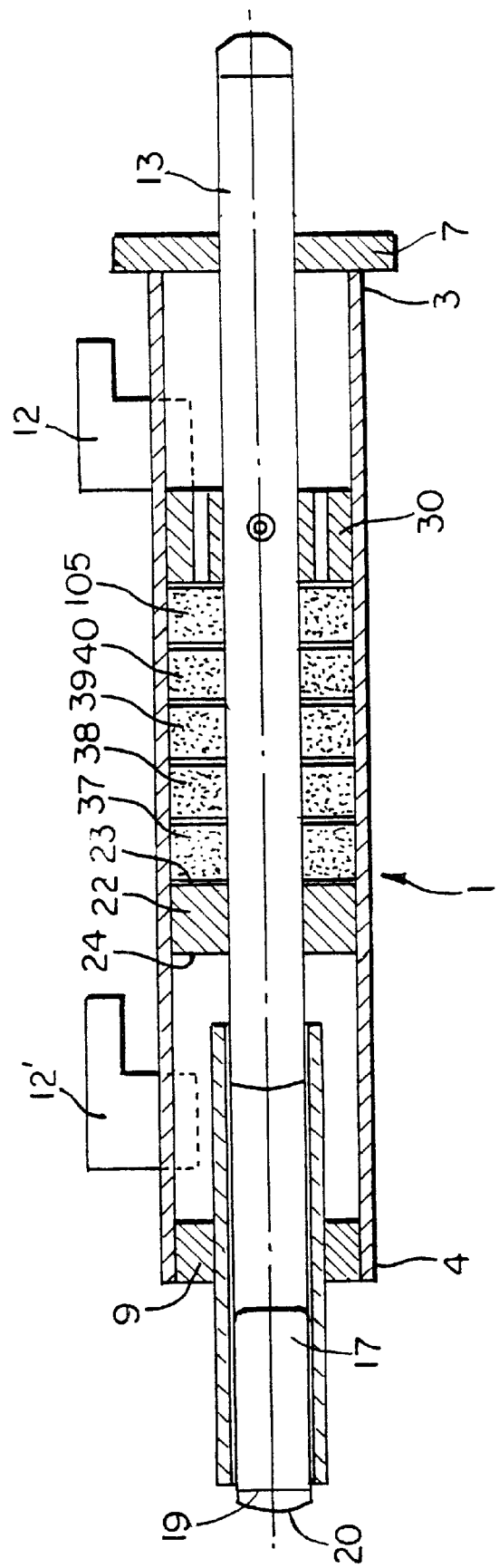
FIG. 26 is a cross-sectional view of another embodiment of this device wherein there is shown a fifth gel layer.
Figure 27:
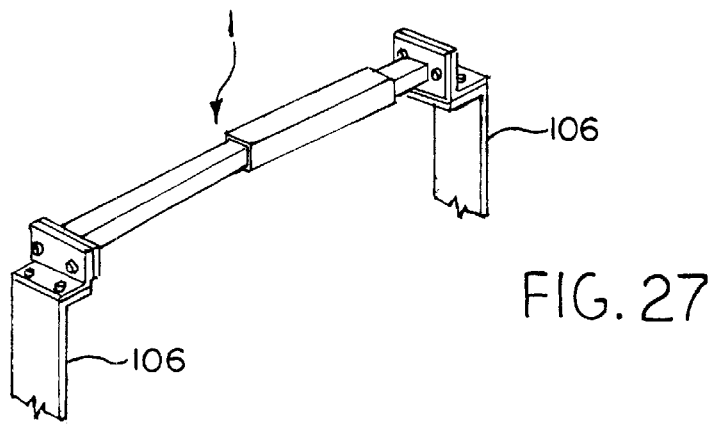
FIG. 27 is a full view in perspective of the installed device designated at M in FIG. 25 attached to a part of the vehicle body frame.
Figure 28:
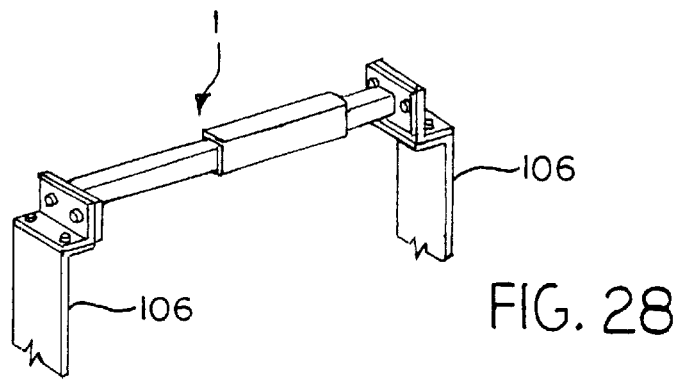
FIG. 28 is a full view in perspective of the installed device designated at N in FIG. 25 attached to a part of the vehicle body frame.
Figure 29:
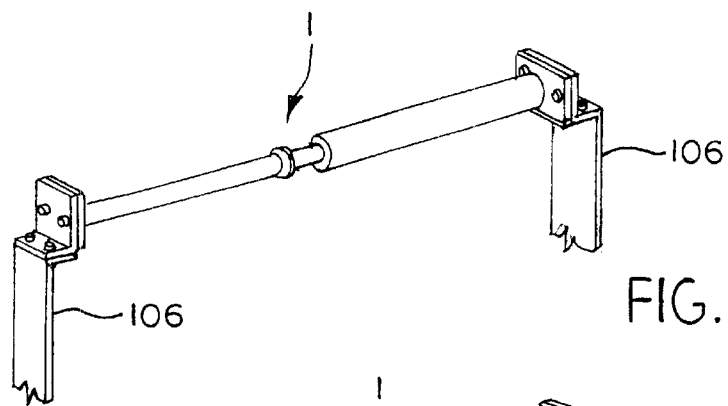
FIG. 29 is a full view in perspective of the installed device designated at O in FIG. 25 attached to a part of the vehicle body frame.
Figure 30:
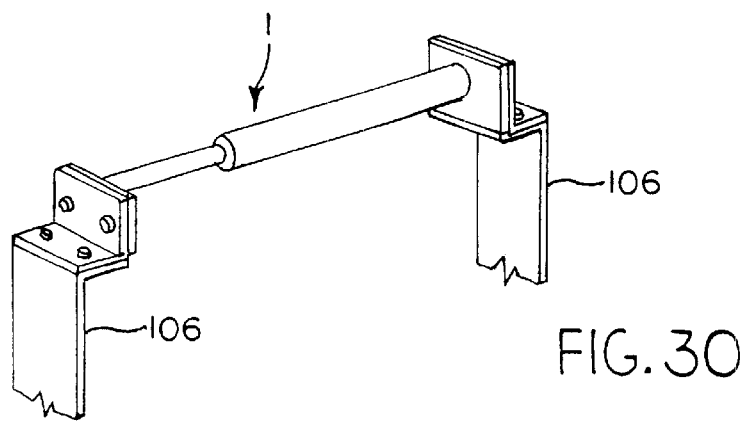
FIG. 30 is a full view in perspective of the installed device designated at P in FIG. 25 attached to a part of the vehicle body frame.

There is another multiple layered gel configuration shown in FIG. 26, in which a fifth gel layer 105 has been added.

Also contemplated within the scope of this invention is the use of gels having various resistances in random layers within the elongated housing 2. Thus, there may be used layers of alternating resistances, such that the resistances of the layers would be greater, lesser, greater, lesser and so on. There is no limit to the number of layers of gels that are used, it being within the skill of those providing the devices to determine how many layers will provide the effect within cost limits for the device. For example, with regard to FIG. 5, it is possible to have layer 38 against the piston stop plug 22, then be layered by layer 37, then with layer 40, and then with layer 39.

Figure 7A:
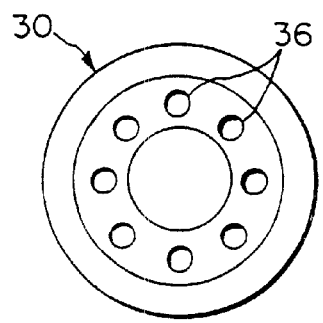
FIG. 7A is a full end view of a piston of this invention wherein the communicative openings are shown through the piston.
Figure 7B:
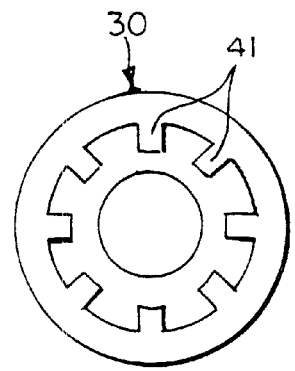
FIG. 7B is a full end view of another embodiment of the piston wherein the communicative openings are channels in the outer surface of the piston.
Figure 8:
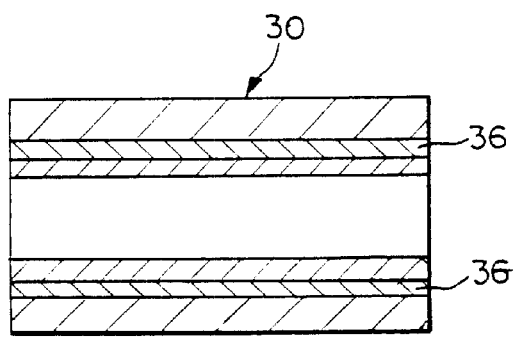
FIG. 8 is a cross-sectional side view of a piston taken from FIG. 6C through line E—E.

Referring now to FIG. 6C, there is shown a full side view of a piston 30 of this invention in which the communicative openings (passageways) 36 are shown in phantom. FIG. 7A is a full end view of the same piston, showing eight communicative openings 36 and they are shown as being internal to the outside wall thereof. For purposes of this invention, a piston 30 can have one or more such communicative openings 36, depending on how one wishes to control the flow of material through the piston 30. FIG. 7B illustrates a full end view of a piston 30, wherein the communicative openings 36 consist of channels 41 in the outside wall of the piston 30 and FIG. 8 is a cross-sectional view of the piston of FIG. 6C through line E—E, showing two such openings 36.

There are at least two ways in which the flow of the gel 27 to the reservoir 35 can be controlled. One way is by the choice of the material or materials that make up the gel 27. This will be described in detail infra. The other way is to control the openings that are used to provide passageways for the moving gel 27. "Flow" for purposes of this invention can be defined as a pressure of "X" applied to a material of this invention, in a space of "Y", which causes the material to flow through an opening of size "Z" at a rate of "W" wherein the flow for the material equals "W", the flow for a second material equals "2W", the flow for a third material equals "3W" and so on, wherein the reverse is also true, so that the second material could equal ⅞W, the third material could equal ⅝W, and the fourth material could equal ⅜W, and so on. The difference between the materials is achieved through the choice of durometer, consistency, and chemical differences of the material, volume per area, additives to the material, and the viscosity of the material as defined by crosslink density.

Figure 6D:
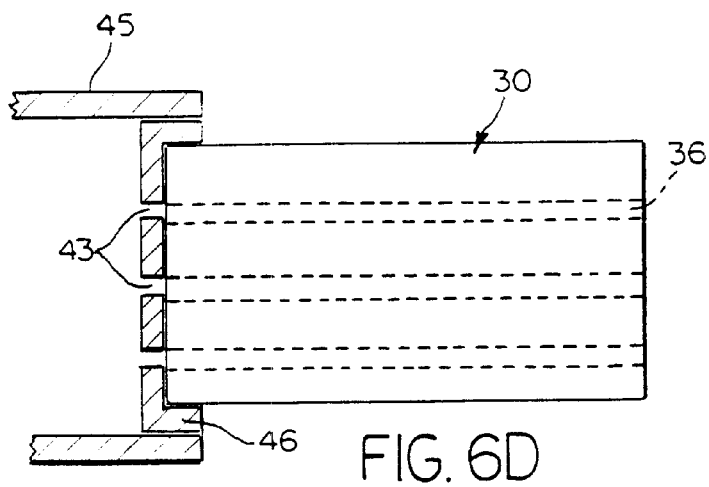
FIG. 6D is a full side view of the piston of FIG. 6B, in the area proscribed by W of FIG. 6B, showing the engagement of one end of the mechanism for varying the communicative openings of the piston with some of the communicative openings shown in phantom.
Figure 9:
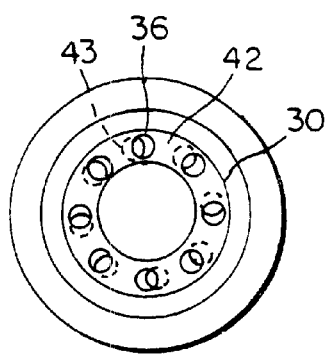
FIG. 9 is a full end view of the piston of FIG. 7A overlaid with the plate from the mechanism for varying the size of such openings, showing the communicative openings partially closed by misalignment of the plate and the piston openings.

Thus, FIGS. 6A and 6B show another embodiment of invention utilizing one device for varying the size of the communicative openings 36. In FIG. 6B, there is shown a mechanism 42 for adjusting the size of the openings 36 in the piston 30. The mechanism 42 has openings 43 and is rotatable around the axis indicated by the line M—M of FIG. 6B, and by rotation of the mechanism 42, the openings 36 are blocked, partially blocked, or unblocked depending on the setting of the mechanism 42. FIG. 9 shows the mechanism at the end of the piston 30, and also shows the openings 43 of component 42. In this manner, the openings 36 are pre-sized prior to the installation of the device 1 in a vehicle. FIG. 6D is an enlarged full side view of the piston 30 of FIG.

6B, in the area proscribed by the area W of FIG. 6B. Rotation of the handle 44 (FIG. 6B), rotates the arms or tube 45, which has the end plate 46 with the holes 43 therein which moves simultaneously with the movement of the handle 44, which creates the blocked, partially blocked, or unblocked openings 36.

Yet another embodiment of this invention utilizing a communicative opening size variation, can be found in FIGS. 10A and 10B wherein 10B is a full cross-sectional view of FIG. 10A through line F—F except that the piston communicative openings are capable of varying sizes by the mechanism shown therein. The mechanism which controls the opening size can be viewed in the area proscribed in the area X of FIG. 10B. The mechanism is comprised of a plate 46 interfacing intimately with the distal side 47 of the piston 30. The plate 46 has a centered aperture 29 for accepting the first solid axially aligned straight shaft 13 therethrough. The plate 46 has a centered axis parallel to the first solid axially aligned straight shaft 13 and the plate 46 has a near side 48 and a distal side 49. The near side 48 has one or more protrusions 50 on the surface thereof. Each protrusion 50 is aligned with a communicative opening 36 in the piston 30. The plate 46 is capable of moving linearly along the shaft 13. Further, the distal side 49 of the plate 46 has a cam surface 51 on it. There is a rotatable cam means 52 having a near end 53 and a distal end 54 and the rotatable cam means 52 is comprised of a cam plate 55. The cam plate 55 is fixedly mounted on the near end 53 such that the cam 56 on the cam plate 55 mates operatively with the cam surface 51 of the plate.

The rotatable cam means 52 comprises at least a pair of elongated arms 57 extending from the cam plate 55 to a point P outside of the distal end 4 of the elongated housing. It is contemplated within the scope of this invention to utilize a tube in place of the arms 57. The arms, or tube 57 have a near end 58 and a distal end 59 and the near end 58 is attached to the cam plate 55. The distal end 59 is attached to a handle 60 for rotating the rotatable cam means 52. The operative end of the mechanism 42 can be observed in FIG. 11, which is an enlarged view of the area proscribed by the area X, in FIG. 10B.

With regard to the movement of the gel 27, and with reference to FIG. 12B, which is a full cross-sectional view of the device of FIG. 12A, wherein there is shown another embodiment of this invention in which the piston 30 that is used is a solid piston, and the communicative openings 61 for the gel 27 are in the piston stop plug 22. In this device, the openings 61 are capped with a gel 62 having a resistance greater than the gel 27 so as to provide a means of stopping the movement of the gel 27 prematurely into the chamber 63.

It should be noted, that the mechanism for varying the size of the communicative openings 36 is shown in FIGS. 6B, 6D, and 9 and can also be used to vary the size of the communicative openings 61 in the piston stop plug 22. Thus, with reference to FIGS. 12C, 12D, and 12E, there is shown yet another embodiment of this invention wherein a mechanism 64 is used to vary the size of the communicative openings 61.

Thus, FIGS. 12C, 12D, 12E, and 12F show another embodiment of the invention utilizing one device for varying the size of the communicative openings 61. In FIG. 12D, there is shown a mechanism 64 for adjusting the size of the openings 61 in the piston stop plug 22. The mechanism 64 has openings 65 and is rotatable around the axis indicated by the line N—N of FIG. 12D, and by rotation of the mechanism 64, the openings 61 are blocked, partially blocked, or unblocked, depending on the setting of the mechanism 64. FIG. 12E shows the mechanism at the end of the piston stop plug 22, it being understood that this view is essentially identical to that for the mechanism used on the piston 30 itself. This view thus shows the openings 65 of plate 70. In this manner, the openings 61 are pre-sized prior to the installation of the device 1 in a vehicle. FIG. 12F is an enlarged full side view of the piston stop plug 22 of FIG. 12D, in the area proscribed by the area Z of FIG. 12D. Rotation of the handle 68 (FIG. 12C), rotates the arms or tube 69, which has the end plate 70 with the holes 65 therein which moves simultaneously with the movement of the handle 68, which creates the blocked, partially blocked, or unblocked openings 61.

There is shown in FIG. 13 a cross-sectional view through line H—H of FIG. 12C showing the interior of the device after impact.

Yet another embodiment of this invention utilizing a communicative opening size variation, can be found in FIGS. 14 and 15, wherein 14 is a full cross-sectional view of FIG. 12C through line H—H except that the piston communicative openings 61 are capable of varying sizes by the mechanism 72 shown therein. The mechanism which controls the opening size can be viewed in the area proscribed in the area Y of FIG. 14, it being understood that such a mechanism is essentially identical to that described above in FIGS. 10B and 11. Now, where like numbers identify like components, the mechanism 72 is comprised of a plate 46 interfacing intimately with the distal side 47 of the piston 30. The plate 46 has a centered aperture 29 for accepting the first solid axially aligned straight shaft 13 therethrough. The plate 46 has a centered axis parallel to the first solid axially aligned straight shaft 13 and the plate 46 has a near side 48 and a distal side 49. The near side 48 has at least one protrusion 50 on the surface thereof. Each protrusion 50 is aligned with a communicative opening 61 in the piston 30. The plate 46 is capable of moving linearly along the shaft 13. Further, the distal side 49 of the plate 46 has a cam surface 51 on it. There is a rotatable cam means 52 having a near end 53 and a distal end 54 and the rotatable cam means 52 is comprised of a cam plate 55. The cam plate 55 is fixedly mounted on the near end 53 such that the cam 56 on the cam plate 55 mates operatively with the cam surface 51 of plate 46.

The rotatable cam means 52 comprises at least a pair of elongated arms 57 extending from the cam plate 55 to a point P outside of the distal end 4 of the elongated housing. It is contemplated within the scope of this invention to utilize a tube in place of the arms 57. The arms 57 have a near end 58 and a distal end 59 and the near end 58 is attached to the cam plate 55. The distal end 59 is attached to a handle 60 for rotating the rotatable cam means 52. The operative end of the mechanism 52 (see FIG. 14) can be observed in FIG. 15, which is an enlarged view of the area proscribed by the area Y, in FIG. 14.

With regard to FIG. 16B, which is a cross-sectional view of FIG. 16A through line I—I, there is shown the channels 73 in the inside surface 6 of the housing 2. These channels extend essentially from the piston stop plug 22 and into the chamber 35 so as to create a communicative opening from the gel 27 to the chamber 35. The number of channels 73 can vary in length, depth, shape and size, and can vary in number, depending on the ultimate design that the craftsman desires to achieve the result desired.

FIG. 17 shows a cross-sectional view of one kind of channel 73 in the inside wall 6 of the housing 2.

FIG. 18 is a cross-sectional view of FIG. 12A through line G—G, except that the gel is shown in several layers. Just as in the device shown in FIG. 5, the gel layers are 37, 38, 39, and 40. The only difference between the device of FIG. 5 and the device as shown in FIG. 18, is that in FIG. 18, the communicative openings 36 of the piston 30, have been moved to the piston stop plug 22, and renumbered as 61, for clarification purposes.

Turning now to the device of FIGS. 19 and 20, there is shown yet another device of the invention in which there is no piston, per se, but instead, the shaft 13 acts as the piston.

With reference to FIGS. 19 and 20, in which FIG. 20 is a cross-sectional view of FIG. 19 through line K—K, there is shown an impact suppression device 74 having a first solid axially aligned straight shaft 75, inserted through and slidably supported in a centered aperture 76 of a support means 77. The first solid axially aligned straight shaft 75 has a near end 78.

There is a second solid axially aligned straight shaft 79 inserted through and slidably supported in a second centered aperture 80 of a second support means 81, the second solid axially aligned straight shaft 79 also has a near end 82.

The first solid axially aligned straight shaft 75 and the second solid axially aligned straight shaft 79 are operatively connected in an axial alignment with a mated male and female spline 83 by the near ends 78 and 82, respectively of the shaft 75 and the shaft 79. The formation of this connection forms a chamber 84 between the respective near ends of the shafts and, the inside wall 85 of the spline 83.

The chamber 84 has contained in it, a predetermined volume of at least one gel 86, capable of being converted from a unitary solid material to a crumb with properties and characteristics of a hydraulic fluid when pressure is applied to it. Shown in the FIG. 20 are several gels 86, 87, 88, and 89, being essentially equivalent to the gels 37, 38, 39, and 40 of the device shown in FIG. 5. In addition, interfacing with the gel 86, on its distal end 90, is a plug of material 91 designed to prevent the premature movement of the gels 86 to 89 through the communicative openings 92 that open from chamber 84 through the wall of the spline 83 into a reservoir 93. The reservoir 93 comprises a housing 94 which housing encloses a portion of the second solid axially aligned straight shaft 79, a portion of the gels 86 and 87, and a portion of the distal end 95 of the spline 83.

Figure 22:
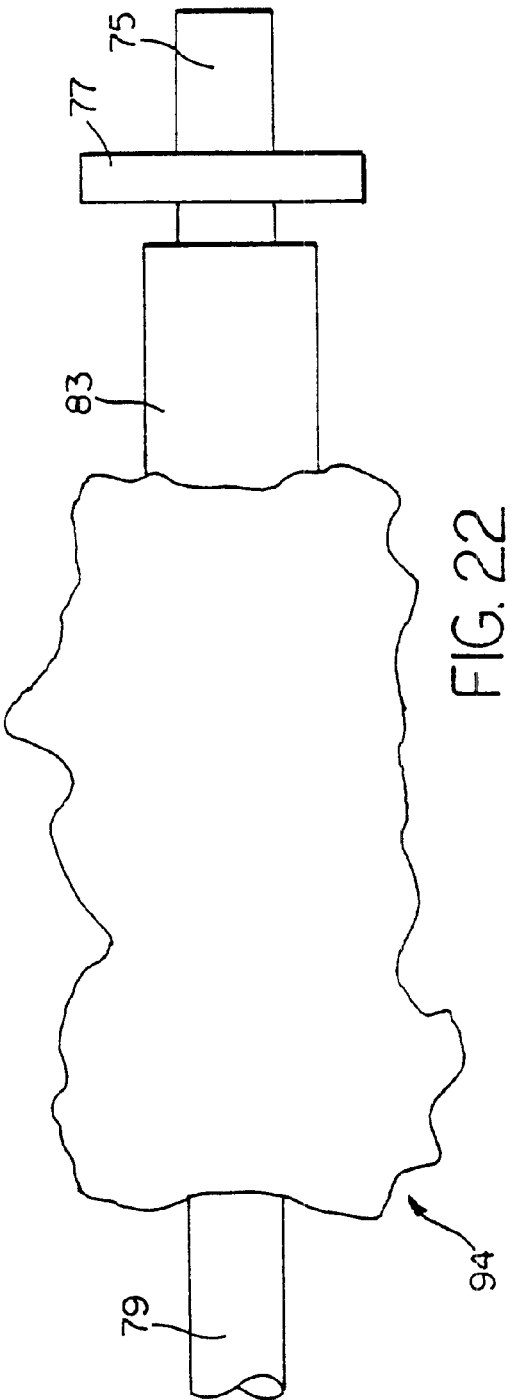
FIG. 22 shows another embodiment of the device of this invention wherein the reservoir is an elastic balloon-like device after impact.

The housing 94 is manufactured from either a rigid or non-rigid material. It is contemplated within the scope of this invention to manufacture the housing 94 from an elastomeric material. Thus, shown in FIG. 22 is a balloon that has been formed because of the activation of the device of FIG. 20, moving the gels 86–89 through the communicative openings 92 into the housing 94, which expands the housing 94 into the configuration of a balloon.

Figure 21:
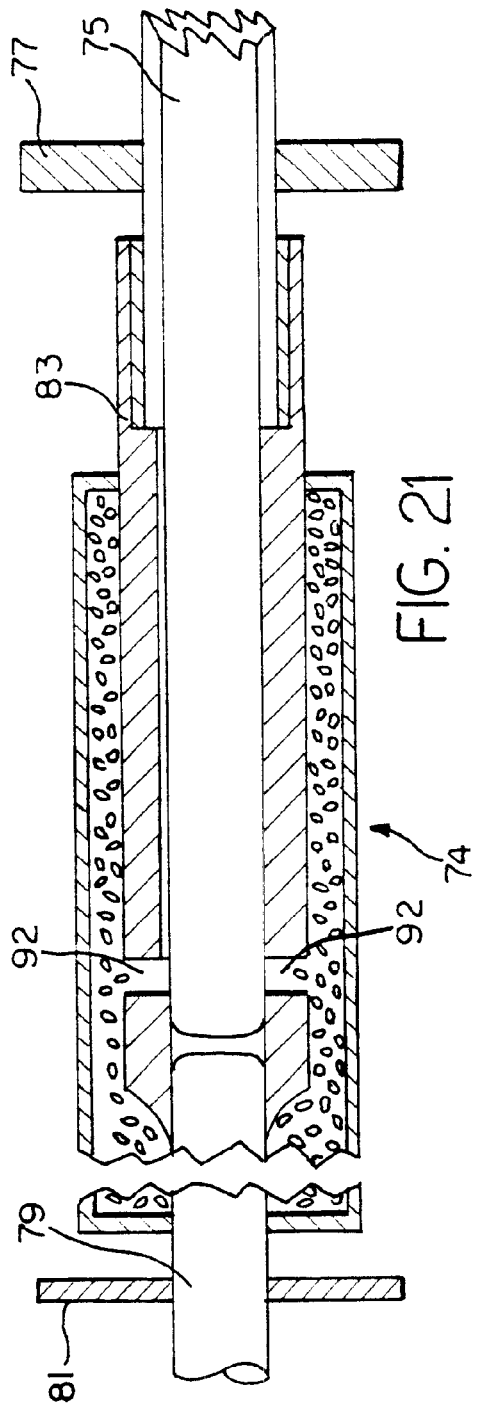
FIG. 21 is a cross-sectional view of FIG. 19 through line K—K showing the result after impact.

FIG. 21 is a cross sectional view of FIG. 19 showing the device of FIG. 19 after impact. The gels 86 through 89 are now crumb rubber shown as particles 95.

With reference to FIGS. 23 and 24, there is shown the device of FIG. 19 that is equipped with a mechanism 96 that is used to reduce the size of the communicative openings 92 in the spline 83. FIG. 23 shows a fragmented Figure wherein a mechanism is shown for varying the size of the openings in the elongated housing for the device of FIG. 19 while FIG. 24 is a cross-sectional view of FIG. 23 through line L—L showing the internal structure of the device.

In the FIG. 24, there is shown the mechanism 96. The mechanism is comprised of a means for varying the size of the communicative openings 92 and consists of a rotatable turning means 97 that is comprised of elongated arms 98 extending from a point Q near the communicative openings 92 in the spline 83, to a point R outside of the housing 94 of the reservoir 93. The arms have a near end 99 and a distal end 100. The near end 99 is attached to a perforated band 101 that has essentially equally spaced perforations 103 which communicate with the communicative openings 92, and which surrounds the outside surface of the spline 83 and in alignment with the communicative openings 92 of the spline 83. The distal end 100 of the arms 98 are attached to a handle 102 for rotating the rotating means and thereby adjusting the size of the communicative openings 92.

Turning now to the use of the devices of this invention in other than steering columns in vehicles, there is contemplated within the scope of this invention to use such devices within the vehicle to provide energy absorption and prevent abrupt deceleration of the occupants therein.

Thus, it is contemplated within the scope of this invention to place the devices of this invention, for example, in fender wells, in and on the frame of the vehicle, under the hood, in the trunk space, and behind bumpers both front and rear, to name a few. Such placements are well known to those skilled in the art and some of the applications are shown in FIGS. 25, 27, 28, 29, and 30. Note especially the device shown in circle Q, which is a side to side impact device.

Figure 25:
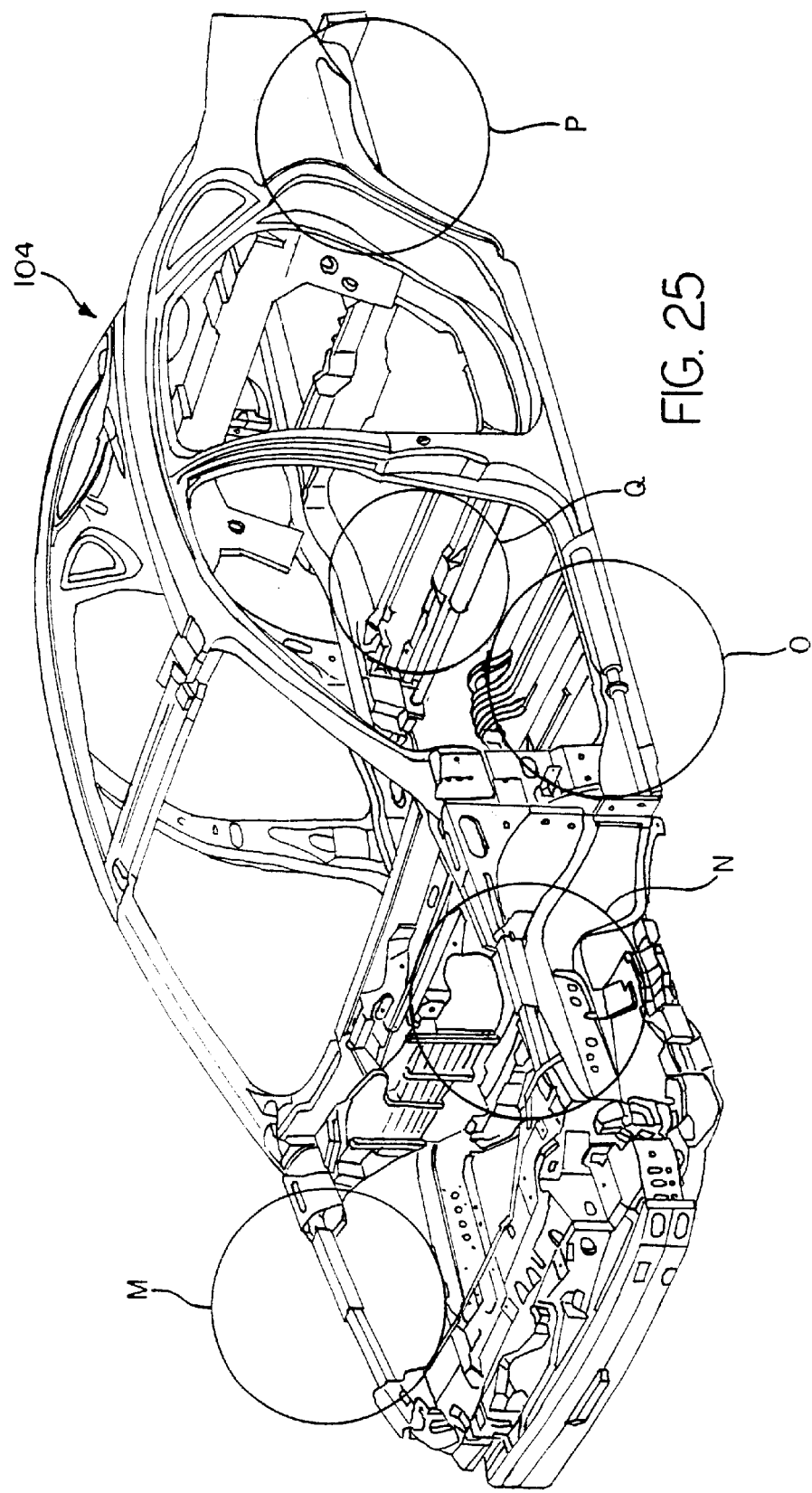
FIG. 25 is a schematic view of the steel structure of a body of a standard automobile with some devices of this invention in place at circled areas M, N, O, P and Q.

Thus, turning to FIG. 25, there is shown a frame 104 for a body of a modern automobile. Shown for illustration purposes are devices of this invention at point M, point N, point O, point P and point Q. Although there are shock absorbing devices of similar design, the invention herein differs in design and function. Current prior art shock absorbers are configured to absorb crash energy before structural damage is done to the main frame. Once impact energy exceeds the absorbers rated absorbable energy point, the frame loses its integrity and the absorber is no longer functional. With the devices of the instant invention, the device is actually part of the body frame. It only needs to function when the absorber has reached maximum energy absorption and the total collapse of the body frame is occurring or about to occur.

In the use of the devices of the instant invention, it is appropriate to take the theoretical collapse points on the automobile body frame, or what could become possible hinge points that would collapse with a major impact on the frame, and fit them with the devices of this invention. Thus, it must be obvious to those skilled in the art upon reading this specification, that the devices of the instant invention can be sized to fit such collapse points, and hence, some of the devices of the instant invention only need to be inches long, while others used in this manner need to be several feet long. Using the devices of the instant invention in the designing of a body frame, when the integrity of the body frame is compromised by an impact, means that these devices would absorb, or greatly minimize the impact energy before it could reach the occupants of the interior of the automobile.

Turning to FIG. 26, there is shown a device 1 of this invention attached to the body frame 106 of a vehicle. As shown, the attachment is by bolting the device 1 to the vehicle body frame 106.

This is a decided safety factor for vehicles occupied by humans because the use of such devices throughout the vehicle will minimize the impact on the occupants of the vehicle.

What is claimed is:

1. An impact suppression device with energy absorbing capability comprising:

an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable to the body frame of a vehicle;

a first solid axially aligned straight shaft inserted through and supported in the centered aperture of the end cap, said first solid axially aligned straight shaft having a near end and a distal end; said first solid axially aligned straight shaft extending outside of the elongated housing and having means on the near end for attachment, said solid axially aligned straight shaft being capable of free reciprocal movement in a direction along the solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment; said first solid axially aligned straight shaft and second solid axially aligned straight shaft being capable of simultaneous rotation by the use the spline located on the first solid axially aligned straight shaft and the second solid axially aligned straight shaft;

a piston stop plug contained within said elongated housing at a point intermediate of the elongated housing distal end and near end, said piston stop plug being fixedly secured to the inside surface of the elongated housing and said piston stop plug having a near side and a distal side; said piston stop plug having a centered aperture therethrough;

said first solid axially aligned straight shaft passing through and being supported by said piston stop plug;

a predetermined volume of a first gel layer capable of being converted from a unitary solid material to a crumb with properties and characteristics of a hydraulic fluid when pressure is applied thereto, said first gel layer being surmounted on the near side of the piston stop plug, said first gel layer having a predetermined resistance to an applied force upon it;

a piston, said piston being mounted on the first solid axially aligned straight shaft and intimately interfacing with the first gel layer, said piston having a near side and an outside surface, the piston located on the first solid axially aligned straight shaft such that a reservoir is formed on the piston near side thereof defined by the piston, the inside wall, and the end cap, said piston having at least one communicative opening from the first gel layer to said reservoir.

2. An impact suppression device as claimed in claim 1 wherein the first gel layer is a cured gel.

3. An impact suppression device as claimed in claim 1 in which there are multiple gel layers with the gel layer adjacent the piston having the least resistance and each succeeding gel layer thereafter having a greater resistance to force than the gel layer preceding it.

4. An impact suppression device as claimed in claim 1 in which there are multiple gel layers with the gel layer adjacent the piston stop plug having the least resistance and each succeeding gel layer thereafter having a greater resistance to force than the gel layer preceding it.

5. An impact suppression device having energy absorbing capability comprising:

an elongated housing, said elongated housing having a near end, and a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being capable of being fixed into said elongated housing;

a means for mounting the elongated housing, the elongated housing being mountable to the body frame of a vehicle;

a first solid axially aligned straight shaft inserted through and supported in the centered aperture of the end cap, said solid axially aligned straight shaft having a near end and a distal end; said first solid axially aligned straight shaft extending outside of the elongated housing and having means on the near end for attachment, said solid axially aligned straight shaft being capable of free reciprocal movement in a direction along the solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment; said first solid axially aligned straight shaft and second solid axially aligned straight shaft being capable of simultaneous rotation by the use of the spline located on the first solid axially aligned straight shaft and the second solid axially aligned straight shaft;

a piston stop plug contained within said elongated housing at a point intermediate of the elongated housing distal end and near end, said piston stop plug being fixedly secured to the inside surface of the elongated housing and said piston stop plug having a near side and a distal side; said piston stop plug having a centered aperture therethrough;

said first solid axially aligned straight shaft passing through and being supported by said piston stop plug;

a predetermined volume of a first gel layer capable of being converted from a unitary solid material to a crumb with properties and characteristics of a hydraulic fluid when pressure is applied thereto, said first gel layer surmounted on the near side of the piston stop plug, said first gel layer having a predetermined resistance to an applied force upon it;

a predetermined volume of a second gel layer capable of being converted from a unitary solid material to a crumb with properties and characteristics of a hydraulic fluid when pressure is applied thereto, said second gel layer surmounted on the first gel layer, said second gel layer having a predetermined resistance to an applied force upon it, such resistance being greater than the resistance of the first gel layer;

a piston, said piston being mounted on the first solid axially aligned straight shaft and intimately interfacing with the second gel layer, said piston having a near side and an outside surface, the piston located on the first solid axially aligned straight shaft such that a reservoir is formed on the piston near side thereof defined by the piston, the inside wall, and the end cap of the elongated housing; said piston having at least one communicative opening from the second gel layer to said reservoir.

6. An impact suppression device as claimed in claim 5 wherein all layers are cured gels.

7. An impact suppression device as claimed in claim 5 in which there is a predetermined volume of a third gel layer capable of being converted from a unitary solid material to a crumb with properties and characteristics of a hydraulic fluid when pressure is applied thereto, said third gel layer surmounted on the second gel layer, which third gel layer has a greater resistance than the second gel layer.

8. An impact suppression device as claimed in claim 7 in which there is a predetermined volume of a fourth gel layer capable of being converted from a unitary solid material to a crumb with properties and characteristics of a hydraulic fluid when pressure is applied thereto, said fourth gel layer surmounted on the third gel layer, which fourth gel layer has a greater resistance than the third gel layer.

9. An impact suppression device as claimed in claim 8 in which there is a predetermined volume of a fifth gel layer capable of being converted from a unitary solid material to a crumb with properties and characteristics of a hydraulic fluid when pressure is applied thereto, said fifth gel layer surmounted on the fourth gel layer, which fifth gel layer has a greater resistance than the fourth gel layer.

10. An impact suppression device with energy absorbing capability comprising:

an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable to the body frame of a vehicle;

a first solid axially aligned straight shaft inserted through and supported in the centered aperture of the end cap, said first solid axially aligned straight shaft having a near end and a distal end; said first solid axially aligned straight shaft extending outside of the elongated housing and having means on the near end for attachment, said first solid axially aligned straight shaft being capable of free reciprocal movement in a direction along the solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment; said first solid axially aligned straight shaft and the second solid axially aligned straight shaft being capable of simultaneous rotation by the use of the spline on the first solid axially aligned straight shaft and the second solid axially aligned straight shaft;

a piston stop plug contained within said elongated housing at a point intermediate of the elongated housing distal end and near end, said piston stop plug being fixedly secured to the inside surface of the elongated housing and said piston stop plug having a near side and a distal side; said piston stop plug having a centered aperture therethrough;

said first solid axially aligned straight shaft passing through and being supported by said piston stop plug;

a predetermined volume of a first gel layer capable of being converted from a unitary solid material to a crumb with properties and characteristics of a hydraulic fluid when pressure is applied thereto, said first gel layer being surmounted on the near side of the piston stop plug, said first gel layer having a predetermined resistance to an applied force upon it;

a piston, said piston being mounted on the first solid axially aligned straight shaft and intimately interfacing with the first gel layer, said piston having a near side, a distal side, and an outside surface, the piston located on the first solid axially aligned straight shaft such that a reservoir is formed on the piston near side thereof defined by the piston, the inside wall, and the end cap of the elongated housing; said piston having at least one communicative opening from the first gel layer to said reservoir;

a means of varying the size of the communicative openings in the piston, said means comprising a plate interfacing intimately with the distal side of the piston, said plate having a centered axis parallel to the first solid axially aligned straight shaft and having a centered aperture for accepting the first solid axially aligned straight shaft therethrough; said plate having at least one communicative opening that aligns with the communicative openings in the piston, said plate being rotatable around the centered axis by means of a rotatable turning means, said rotatable turning means comprising elongated arms extending from the plate to a point outside of the distal end of the elongated housing, said arms having a near end and a distal end, the near end being attached to the plate, the distal end being attached to a handle for rotating the rotating means.

11. An impact suppression device with energy absorbing capability comprising:

an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable by each end to the body frame of a vehicle at said one point of susceptible collapse;

a first solid axially aligned straight shaft inserted through and supported in the centered aperture of the end cap, said first solid axially aligned straight shaft having a near end and a distal end; said first solid axially aligned straight shaft extending outside of the elongated housing and having means on the near end for attachment, said solid axially aligned straight shaft being capable of free reciprocal movement in a direction along the solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment; said first solid axially aligned straight shaft and second solid axially aligned straight shaft being capable of simultaneous rotation by the use of the spline located on the first solid axially aligned straight shaft and second solid axially aligned straight shaft;

a piston stop plug contained within said elongated housing at a point intermediate of the elongated housing distal end and near end, said piston stop plug being fixedly secured to the inside surface of the elongated housing and said piston stop plug having a near side and a distal side; said piston stop plug having a centered aperture therethrough;

said first solid, axially aligned straight shaft passing through and being supported by said piston stop plug;

a predetermined volume of a first gel layer capable of being converted from a unitary solid material to a crumb with properties and characteristics of a hydraulic fluid when pressure is applied thereto, said first gel layer being surmounted on the near side of the piston stop plug, said first gel layer having a predetermined resistance to an applied force upon it;

a piston, said piston being mounted on the first solid axially aligned straight shaft and intimately interfacing with the first gel layer, said piston having a near side, a distal side, and an outside surface, the piston located on the first solid axially aligned straight shaft such that a reservoir is formed on the piston near side thereof defined by the piston, the inside wall, and the end cap of the elongated housing; said piston having at least one communicative opening from the first gel layer to said reservoir;

a means of varying the size of the communicative openings in the piston, said means comprising a plate interfacing intimately with the distal side of the piston, said plate having a centered aperture for accepting the first solid axially aligned straight shaft therethrough; said plate having a centered axis parallel to the first solid axially aligned straight shaft and said plate having a near side and a distal side, said near side having at least one protrusion on the surface thereof, each said protrusion being aligned with a communicative opening in the piston, said plate being capable of moving linearly along the first solid axially aligned straight shaft; the distal side of the plate having a cam surface thereon;

a rotatable cam means having a near end and a distal end, said rotatable cam means comprising a cam plate, said cam plate being fixedly mounted on the near end such that the cam on the cam plate mates operatively with the cam surface of the plate on the distal side of the piston;

the rotatable cam means comprising elongated arms extending from the cam plate to a point outside of the distal end of the elongated housing, said arms having a near end and a distal end, the near end being attached to the cam plate, the distal end being attached to a handle for rotating the rotatable cam means.

12. An impact suppression device having energy absorbing capability comprising:

an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable to the body frame of a vehicle;

a first solid axially aligned straight shaft inserted through and supported in the centered aperture of the end cap, said first solid axially aligned straight shaft having a near end and a distal end; said first solid axially aligned straight shaft extending outside of the elongated housing and having means on the near end for attachment, said first solid axially aligned straight shaft being capable of free reciprocal movement in a direction along the solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment;

said first solid axially aligned straight shaft and second solid axially aligned straight shaft being capable of simultaneous rotation by the use of the spline located on the shafts of the first solid axially aligned straight shaft and the second solid axially aligned straight shaft;

a piston stop plug contained within said elongated housing at a point intermediate of the elongated housing distal end and near end, said piston stop plug being fixedly secured to the inside surface of the elongated housing; said piston stop plug having a centered aperture therethrough; said piston stop plug having a near side and a distal side, the piston stop plug located such that a reservoir is formed on the piston stop plug distal side thereof defined by the piston stop plug, the inside wall, and the alignment plug of the elongated housing; said piston stop plug having at least one opening therethrough opening from the piston to said reservoir, said first solid axially aligned straight shaft passing through and being supported by said piston stop plug;

a predetermined volume of a first gel layer capable of being converted from a unitary solid material to a crumb with properties and characteristics of a hydraulic fluid when pressure is applied thereto, said first gel layer surmounted in a containment area on the near side of the piston stop plug, said first gel layer having a predetermined resistance to an applied force upon it;

a piston, said piston being mounted on the first solid axially aligned straight shaft and intimately interfacing with the first gel layer.

13. An impact suppression device as claimed in claim 12 in which there are multiple gel layers with the gel layer adjacent the piston having the least resistance and each succeeding gel layer thereafter having a greater resistance to force than the gel layer preceding it.

14. An impact suppression device as claimed in claim 12 in which there are multiple gel layers having random resistance.

15. An impact suppression device as claimed in claim 12 in which there are multiple gel layers with the gel layer adjacent the piston stop plug having the least resistance and each succeeding gel layer thereafter having a greater resistance to force than the gel layer preceding it.

16. An impact suppression device having energy absorbing capability comprising:

an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable to the body frame of a vehicle;

a first solid axially aligned straight shaft inserted through and supported in the centered aperture of the end cap, said first solid axially aligned straight shaft having a near end and a distal end; said first solid axially aligned straight shaft extending outside of the elongated housing and having means on the near end for attachment, said first solid axially aligned straight shaft being capable of free reciprocal movement in a direction along the solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment; said first solid axially aligned straight shaft and second solid axially aligned straight shaft being capable of simultaneous rotation by the use of the spline located on the shafts of the first solid axially aligned straight shaft and the second solid axially aligned straight shaft;

a piston stop plug contained within said elongated housing at a point intermediate of the elongated housing distal end and near end, said piston stop plug being fixedly secured to the inside surface of the elongated housing; said piston stop plug having a centered aperture therethrough; said piston stop plug having a near side and a distal side, the piston stop plug located such that a reservoir is formed on the piston stop plug distal side thereof defined by the piston stop plug, the inside wall, and the alignment plug of the elongated housing; said piston stop plug having at least one opening therethrough opening from the piston stop plug to said reservoir, said first solid axially aligned straight shaft passing through and being supported by said piston stop plug;

a predetermined volume of a first gel layer capable of being converted from a unitary solid material to a crumb with properties and characteristics of a hydraulic fluid when pressure is applied thereto, said first gel layer surmounted on the near side of the piston stop plug, said first gel layer having a predetermined resistance to an applied force upon it;

a piston, said piston being mounted on the first solid axially aligned straight shaft and intimately interfacing with the first gel layer;

a means of varying the size of the communicative openings in the piston stop plug, said means comprising a plate interfacing intimately with the distal side of the piston stop plug, said plate having a centered axis parallel to the first solid axially aligned straight shaft, said plate having a centered aperture for accepting the first solid axially aligned straight shaft therethrough and said plate having at least one communicative opening that aligns with the communicative openings in the piston stop plug, said plate being rotatable around the centered axis by means of a rotatable turning means, said rotatable turning means comprising elongated arms extending from the plate to a point outside of the distal end of the elongated housing, said arms having a near end and a distal end, the near end being attached to the plate, the distal end being attached to a handle for rotating the rotating means.

17. An impact suppression device having energy absorbing capability comprising:

an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable to the body frame of a vehicle;

a first solid axially aligned straight shaft inserted through and supported in the centered aperture of the end cap, said first solid axially aligned straight shaft having a near end and a distal end; said first solid axially aligned straight shaft extending outside of the elongated housing and having means on the near end for attachment, said first solid axially aligned straight shaft being capable of free reciprocal movement in a direction along the first solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment; said first solid axially aligned straight shaft and second solid axially aligned straight shaft being capable of shafts of the first solid axially aligned straight shaft and the second solid axially aligned straight shaft;

a predetermined volume of a first gel layer capable of being converted from a unitary solid material to a crumb with properties and characteristics of a hydraulic fluid when pressure is applied thereto, said first gel layer surmounted on the near side of the piston stop plug, said first gel layer having a predetermined resistance to an applied force upon it;

a piston stop plug contained within said elongated housing at a point intermediate of the elongated housing distal end and near end, said piston stop plug being fixedly secured to the inside surface of the elongated housing; said piston stop plug having a centered aperture therethrough and having a bearing surface contained therein; said piston stop plug having a near side and a distal side, the piston stop plug located such that a reservoir is formed on the piston stop plug distal side thereof defined by the piston stop plug, the inside wall, and the alignment plug of the elongated housing; said piston stop plug having at least one communicative opening therethrough opening from the containment area for the piston stop plug to said reservoir, said first solid, axially aligned straight shaft passing through and being supported by said piston stop plug;

a means of varying the size of the communicative openings in the piston stop plug, said means comprising a plate interfacing intimately with the distal side of the piston stop plug, said plate having a centered aperture for accepting the first solid axially aligned straight shaft therethrough; said plate having a centered axis parallel to the first solid axially aligned straight shaft and said plate having a near side and a distal side, said near side having at least one protrusion on the surface thereof, each said protrusion being aligned with a communicative opening in the piston stop plug, said plate being capable of moving linearly along the first solid axially aligned straight shaft, the distal side of the plate having a cam surface thereon;

a rotatable cam means having a near end and a distal end, said rotatable cam means comprising a cam plate, said cam plate being fixedly mounted on the near end such that the cam on the cam plate mates operatively with the cam surface of the plate on the distal side of the piston;

the rotatable cam means comprising elongated arms extending from the cam plate to a point outside of the distal end of the elongate housing, said arms having a near end and a distal end, the near end being attached to the cam plate, the distal end being attached to a handle for rotating the rotatable cam means;

a piston, said piston being mounted on the first solid axially aligned straight shaft and intimately interfacing with the rotatable cam means.

18. An impact suppression device with energy absorbing capability comprising:

an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable to the body frame of a vehicle;

a first solid axially aligned straight shaft inserted through and supported in the centered aperture of the end cap, said first solid axially aligned straight shaft having a near end and a distal end; said first solid axially aligned straight shaft extending outside of the elongated housing and having means on the near end for attachment, said first solid axially aligned straight shaft being capable of free reciprocal movement in a direction along the solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment; said first solid axially aligned straight shaft and second solid axially aligned straight shaft being capable of simultaneous rotation by the use of the spline located on the first solid axially aligned straight shaft and the second solid axially aligned straight shaft;

a piston stop plug contained within said elongated housing at a point intermediate of the elongated housing distal end and near end, said piston stop plug being fixedly secured to the inside surface of the elongated housing and said piston stop plug having a near side and a distal side; said piston stop plug having a centered aperture therethrough;

said first solid axially aligned straight shaft passing through and being supported by said piston stop plug;

a predetermined volume of a first gel layer capable of being converted from a unitary solid material to a crumb with properties and characteristics of a hydraulic fluid when pressure is applied thereto, said first gel layer being surmounted on the near side of the piston stop plug, said first gel layer having a predetermined resistance to an applied force upon it;

a piston, said piston being mounted on the first solid axially aligned straight shaft and intimately interfacing with the first gel layer, said piston having a near side and an outside surface, the piston located on the first solid axially aligned straight shaft such that a reservoir is formed on the piston near side thereof defined by the piston, the inside wall, and the end cap of the elongated housing; said elongated housing having one or more channels in the inside surface thereof, which channels provide a communication between the first gel layer and the reservoir.

19. An impact suppression device as claimed in claim 1 wherein the openings are a combination of openings in the piston and channels on the inside surface of the elongated housing.

20. An impact suppression device as claimed in claim 5 wherein the piston is fixed to the first solid axially aligned straight shaft by the use of a shear pin that will shear upon the application of a predetermined force.

21. An impact suppression device as claimed in claim 5 wherein the piston is permanently fixed to the first solid axially aligned straight shaft.

22. An impact suppression device as claimed in claim 21 wherein the piston is glued to the first solid axially aligned straight shaft in the mated spline, said glue being capable of being sheared upon the application of a force.

23. An impact suppression device as claimed in claim 21 wherein the piston is welded to the first solid axially aligned straight shaft.

24. An impact suppression device having energy absorbing capability comprising:

an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable to the body frame of a vehicle;

a first solid axially aligned straight shaft inserted through and supported in the centered aperture of the end cap, said first solid axially aligned straight shaft having a near end and a distal end; said first solid axially aligned straight shaft extending outside of the elongated housing and having means on the near end for attachment, said first solid axially aligned straight shaft being capable of free reciprocal movement in a direction along the first solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment; the first solid axially aligned straight shaft and the second solid axially aligned straight shaft being capable of simultaneous rotation by the use of the spline located on the first solid axially aligned straight shaft and the second solid axially aligned straight shaft;

a piston stop plug contained within said elongated housing at a point intermediate of the elongated housing distal end and near end, said piston stop plug being fixedly secured to the inside surface of the elongated housing; said piston stop plug having a centered aperture therethrough and having a bearing surface contained therein; said piston stop plug having a near side and a distal side, the piston stop plug located such that a reservoir is formed on the piston stop plug distal side thereof defined by the piston stop plug, the inside wall, and the alignment plug of the elongated housing; said piston stop plug having at least one communicative opening therethrough opening from the piston to said reservoir, said first solid axially aligned straight shaft passing through and being supported by said piston stop plug;

a predetermined volume of a first gel layer capable of being converted from a unitary solid material to a crumb with properties and characteristics of a hydraulic fluid when pressure is applied thereto, said first gel layer surmounted on the near side of the piston stop plug, said first gel layer having a predetermined resistance to an applied force upon it;

a predetermined volume of a second gel layer capable of being converted from a unitary solid material to a crumb with properties and characteristics of a hydraulic fluid when pressure is applied thereto, said second gel layer surmounted on the first gel layer, said second gel layer having a predetermined resistance to an applied force upon it, such resistance being greater than the resistance of the first gel layer; each succeeding gel layer having a lesser or greater resistance than the preceding gel layer with the proviso that if the first gel layer has a greater resistance to force, then all succeeding gel layers have a greater resistance to force than the preceding gel layer, and with the further proviso that if the first gel layer has a lesser resistance to force, then all succeeding gel layers have a lesser resistance to force than the preceding gel layer;

a piston, said piston being mounted on the first solid axially aligned straight shaft and intimately interfacing with the second gel layer.

25. An impact suppression device as claimed in claim 24 in which there is a predetermined volume of a gel layer capable of being converted from a unitary solid material to a crumb with properties and characteristics of a hydraulic fluid when pressure is applied thereto, said gel layer surmounted on the first gel layer to form a second gel layer which second gel layer has a greater resistance than the first gel layer.

26. An impact suppression device as claimed in claim 25 in which there is a predetermined volume of a third gel layer capable of being converted from a unitary solid material to a crumb with properties and characteristics of a hydraulic fluid when pressure is applied thereto, said third gel layer being surmounted on the second gel layer to form yet a third gel layer which third gel layer has a greater resistance than the second gel layer.

27. An impact suppression device as claimed in claim 5 in which the spline is press-fitted such that a predetermined force is needed to start movement of the male spline through the female spline upon the application of at least the force that is predetermined.

28. An impact suppression device with energy absorbing capability comprising:

an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable to the body frame of a vehicle;

a first solid axially aligned straight shaft inserted through and slidably supported in a centered aperture of a support means, said first solid axially aligned straight shaft having a near end;

a second solid axially aligned straight shaft inserted through and slidably supported in a centered aperture of a second support means, said second solid axially aligned straight shaft having a near end;

said first solid axially aligned straight shaft and second solid axially aligned straight shaft being operatively connected in an axial alignment with a mated spline by the near end of the first solid axially aligned straight shaft and the near end of the second solid axially aligned straight shaft such that there is formed a chamber between the respective near ends of the shafts and the inside wall of the spline, said spline having a wall;

said chamber containing therein a predetermined volume of at least one gel layer capable of being converted from a unitary solid material to a crumb with properties and characteristics of a hydraulic fluid when pressure is applied thereto;

said chamber having at least one communicative opening from the chamber through the wall of the spline into a reservoir, said reservoir comprising a housing, which housing encloses a portion of the second solid axially aligned straight shaft, a portion of the first gel layer, a portion of the distal end of the spline and, all of the communicative openings.

29. An impact suppression device with energy absorbing capability as claimed in claim 28 wherein the reservoir is non-elastomeric.

30. An impact suppression device with energy absorbing capability as claimed in claim 28 wherein the reservoir is elastomeric.

31. An impact suppression device with energy absorbing capability comprising:

an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable to the body frame of a vehicle;

a first solid axially aligned straight shaft, said first solid axially aligned straight shaft having a near end;

a second solid axially aligned straight shaft, said second solid axially aligned straight shaft having a near end;

said first solid axially aligned straight shaft and said second solid axially aligned straight shaft being operatively connected in an axial alignment with a mated spline by the near end of the first solid axially aligned straight shaft and the near end of the second solid axially aligned straight shaft such that there is formed a chamber between the respective near ends of the shafts and, the inside wall of the spline, said spline having a distal end and an outside surface;

said chamber containing therein a predetermined volume of at least one gel layer capable of being converted from a unitary solid material to a crumb with properties and characteristics of a hydraulic fluid when pressure is applied thereto;

said chamber having at least one communicative opening from the chamber through the wall of the spline into a reservoir, said reservoir comprising a housing, which housing encloses a portion of the second solid axially aligned straight shaft, a portion of the gel layer, a portion of the distal end of the spline and, all of the communicative openings;

a means of varying the size of the communicative openings in the spline, said means comprising a rotatable turning means, said rotatable turning means comprising elongated arms extending from a point near the communicative openings in the spline to a point outside of the housing of the reservoir, said arms having a near end and a distal end, the near end being attached to a perforated band which surrounds the outside surface of the spline and in alignment with the communicative openings of the spline, the distal end of the arms being attached to a handle for rotating the rotating means.

32. A method of providing energy absorption for a vehicle, the method comprising affixing at least one device to a body frame of a vehicle at at least one theoretical collapse point which would be susceptible to collapse by a crash of the vehicle, said energy absorbing device comprising:

an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable by each end to the body frame of a vehicle at said one point of susceptible collapse;

a first solid axially aligned straight shaft inserted through and supported in the centered aperture of the end cap, said first solid axially aligned straight shaft having a near end and a distal end; said first solid axially aligned straight shaft extending outside of the elongated housing and having means on the near end for attachment, said solid axially aligned straight shaft being capable of free reciprocal movement in a direction along the solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment; said first solid axially aligned straight shaft and second solid axially aligned straight shaft being capable of simultaneous rotation by the use the spline located on the first solid axially aligned straight shaft and the second solid axially aligned straight shaft;

a piston stop plug contained within said elongated housing at a point intermediate of the elongated housing distal end and near end, said piston stop plug being fixedly secured to the inside surface of the elongated housing and said piston stop plug having a near side and a distal side; said piston stop plug having a centered aperture therethrough;

said first solid axially aligned straight shaft passing through and being supported by said piston stop plug;

a predetermined volume of a first gel layer capable of being converted from a unitary solid material to a crumb with properties and characteristics of a hydraulic fluid when pressure is applied thereto, said first gel layer being surmounted on the near side of the piston stop plug, said first gel layer having a predetermined resistance to an applied force upon it;

a piston, said piston being mounted on the first solid axially aligned straight shaft and intimately interfacing with the first gel layer, said piston having a near side and an outside surface, the piston located on the first solid axially aligned straight shaft such that a reservoir is formed on the piston near side thereof defined by the piston, the inside wall, and the end cap; said piston having at least one communicative opening from the first gel layer to said reservoir.

33. A method of providing energy absorption for a vehicle the method comprising:

(I) determining at least one point of theoretical collapse point in the vehicle which would be susceptible to collapse by a crash of the vehicle, (II) affixing at least one energy absorbing device to the body frame at said one theoretical collapse point, wherein the device comprises:

an impact suppression device having energy absorbing capability comprising:

an elongated housing, said elongated housing having a near end, and a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being capable of being fixed into said elongated housing;

a means for mounting the elongated housing, the elongated housing being mountable to the body frame of a vehicle;

a first solid axially aligned straight shaft inserted through and supported in the centered aperture of the end cap, said solid axially aligned straight shaft having a near end and a distal end; said first solid axially aligned straight shaft extending outside of the elongated housing and having means on the near end for attachment, said solid axially aligned straight shaft being capable of free reciprocal movement in a direction along the solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment; said first solid axially aligned straight shaft and second solid axially aligned straight shaft being capable of simultaneous rotation by the use of the spline located on the first solid axially aligned straight shaft and the second solid axially aligned straight shaft;

a piston stop plug contained within said elongated housing at a point intermediate of the elongated housing distal end and near end, said piston stop plug being fixedly secured to the inside surface of the elongated housing and said piston stop plug having a near side and a distal side; said piston stop plug having a centered aperture therethrough;

said first solid axially aligned straight shaft passing through and being supported by said piston stop plug;

a predetermined volume of a first gel layer capable of being converted from a unitary solid material to a crumb with properties and characteristics of a hydraulic fluid when pressure is applied thereto, said first gel layer surmounted on the near side of the piston stop plug, said first gel layer having a predetermined resistance to an applied force upon it;

a predetermined volume of a second gel layer capable of being converted from a unitary solid material to a crumb with properties and characteristics of a hydraulic fluid when pressure is applied thereto, said second gel layer surmounted on the first gel layer, said second gel layer having a predetermined resistance to an applied force upon it, such resistance being greater than the resistance of the first gel layer;

a piston, said piston being mounted on the first solid axially aligned straight shaft and intimately interfacing with the second gel layer, said piston having a near side and an outside surface, the piston located on the first solid axially aligned straight shaft such that a reservoir is formed on the piston near side thereof defined by the piston, the inside wall, and the end cap of the elongated housing; said piston having at least one communicative opening from the second gel layer to said reservoir.

34. A method of providing energy absorption for a vehicle the method comprising:

(I) determining at least one point of theoretical collapse point in the vehicle which would be susceptible to collapse by a crash of the vehicle, (II) affixing at least one energy absorbing device to the body frame at said one theoretical collapse point, wherein the device comprises:

an impact suppression device having energy absorbing capability comprising:

an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable to the body frame of a vehicle;

a first solid axially aligned straight shaft inserted through and supported in the centered aperture of the end cap, said first solid axially aligned straight shaft having a near end and a distal end; said first solid axially aligned straight shaft extending outside of the elongated housing and having means on the near end for attachment, said first solid axially aligned straight shaft being capable of free reciprocal movement in a direction along the solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment;

said first solid axially aligned straight shaft and second solid axially aligned straight shaft being capable of simultaneous rotation by the use of the spline located on the first solid axially aligned straight shaft and second solid axially aligned straight shaft;

a piston stop plug contained within said elongated housing at a point intermediate of the elongated housing distal end and near end, said piston stop plug being fixedly secured to the inside surface of the elongated housing and said piston stop plug having a near side and a distal side; said piston stop plug having a centered aperture therethrough;

said first solid axially aligned straight shaft passing through and being supported by said piston stop plug;

a predetermined volume of a first gel layer capable of being converted from a unitary solid material to a crumb with properties and characteristics of a hydraulic fluid when pressure is applied thereto, said first gel layer being surmounted on the near side of the piston stop plug, said first gel layer having a predetermined resistance to an applied force upon it;

a piston, said piston being mounted on the first solid axially aligned straight shaft and intimately interfacing with the first gel layer, said piston having a near side, a distal side, and an outside surface, the piston located on the first solid axially aligned straight shaft such that a reservoir is formed on the piston near side thereof defined by the piston, the inside wall, and the end cap of the elongated housing; said piston having at least one communicative opening from the first gel layer to said reservoir;

a means of varying the size of the communicative openings in the piston, said means comprising a plate interfacing intimately with the distal side of the piston, said plate having a centered aperture for accepting the first solid axially aligned straight shaft therethrough; said plate having a centered axis parallel to the first solid axially aligned straight shaft and said plate having a near side and a distal side, said near side having at least one protrusion on the surface thereof, each said protrusion being aligned with a communicative opening in the piston, said plate being capable of moving linearly along the first solid axially aligned straight shaft; the distal side of the plate having a cam surface thereon;

a rotatable cam means having a near end and a distal end, said rotatable cam means comprising a cam plate, said cam plate being fixedly mounted on the near end such that the cam on the cam plate mates operatively with the cam surface of the plate on the distal side of the piston;

the rotatable cam means comprising elongated arms extending from the cam plate to a point outside of the distal end of the elongated housing, said arms having a near end and a distal end, the near end being attached to the cam plate, the distal end being attached to a handle for rotating the rotatable cam means.

35. A method of providing energy absorption for a vehicle the method comprising:

(I) determining at least one point of theoretical collapse point in the vehicle which would be susceptible to collapse by a crash of the vehicle, (II) affixing at least one energy absorbing device to the body frame at said one theoretical collapse point, wherein the device comprises:

an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable to the body frame of a vehicle;

a first solid axially aligned straight shaft inserted through and supported in the centered aperture of the end cap, said first solid axially aligned straight shaft having a near end and a distal end; said first solid axially aligned straight shaft extending outside of the elongated housing and having means on the near end for attachment, said first solid axially aligned straight shaft being capable of free reciprocal movement in a direction along the solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment;

said first solid axially aligned straight shaft and second solid axially aligned straight shaft being capable of simultaneous rotation by the use of the spline located on the shafts of the first solid axially aligned straight shaft and the second solid axially aligned straight shaft;

a piston stop plug contained within said elongated housing at a point intermediate of the elongated housing distal end and near end, said piston stop plug being fixedly secured to the inside surface of the elongated housing; said piston stop plug having a centered aperture therethrough; said piston stop plug having a near side and a distal side, the piston stop plug located such that a reservoir is formed on the piston stop plug distal side thereof defined by the piston stop plug, the inside wall, and the alignment plug of the elongated housing; said piston stop plug having at least one opening therethrough opening from the piston to said reservoir, said first solid axially aligned straight shaft passing through and being supported by said piston stop plug;

a predetermined volume of a first gel layer capable of being converted from a unitary solid material to a crumb with properties and characteristics of a hydraulic fluid when pressure is applied thereto, said first gel layer surmounted in a containment area on the near side of the piston stop plug, said first gel layer having a predetermined resistance to an applied force upon it;

a piston, said piston being mounted on the first solid axially aligned straight shaft and intimately interfacing with the first gel layer.

36. A method of providing energy absorption for a vehicle the method comprising:

(I) determining at least one point of theoretical collapse point in the vehicle which would be susceptible to collapse by a crash of the vehicle, (II) affixing at least one energy absorbing device to the body frame at said one theoretical collapse point, wherein the device comprises:

an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable to the body frame of a vehicle;

a first solid axially aligned straight shaft inserted through and supported in the centered aperture of the end cap, said first solid axially aligned straight shaft having a near end and a distal end; said first solid axially aligned straight shaft extending outside of the elongated housing and having means on the near end for attachment, said first solid axially aligned straight shaft being capable of free reciprocal movement in a direction along the solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment;

a piston stop plug contained within said elongated housing at a point intermediate of the elongated housing distal end and near end, said piston stop plug being fixedly secured to the inside surface of the elongated housing; said piston stop plug having a centered aperture therethrough; said piston stop plug having a near side and a distal side, the piston stop plug located such that a reservoir is formed on the piston stop plug distal side thereof defined by the piston stop plug, the inside wall, and the alignment plug of the elongated housing; said piston stop plug having one or more orifices therethrough opening from the piston top plug to said reservoir, said first solid axially aligned straight shaft passing through and being supported by said piston stop plug;

a predetermined volume of a first gel layer capable of being converted from a unitary solid material to a crumb with properties and characteristics of a hydraulic fluid when pressure is applied thereto, said first gel layer surmounted on the near side of the piston stop plug, said first gel layer having a predetermined resistance to an applied force upon it;

a piston, said piston being mounted on the first solid axially aligned straight shaft and intimately interfacing with the first gel layer;

a means of varying the size of the communicative openings in the piston stop plug, said means comprising a plate interfacing intimately with the distal side of the piston stop plug, said plate having a centered axis parallel to the first solid axially aligned straight shaft, said plate having a centered aperture for accepting the first solid axially aligned straight shaft therethrough and said plate having at least one communicative opening that aligns with the communicative openings in the piston stop plug, said plate being rotatable around the centered axis by means of a rotatable turning means, said rotatable turning means comprising elongated arms extending from the plate to a point outside of the distal end of the elongated housing, said arms having a near end and a distal end, the near end being attached to the plate, the distal end being attached to a handle for rotating the rotating means.

37. A method of providing energy absorption for a vehicle the method comprising:

(I) determining at least one point of theoretical collapse point in the vehicle which would be susceptible to collapse by a crash of the vehicle, (II) affixing at least one energy absorbing device to the body frame at said one theoretical collapse point, wherein the device comprises:

an impact suppression device having energy absorbing capability comprising:

an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable to the body frame of a vehicle;

a first solid axially aligned straight shaft inserted through and supported in the centered aperture of the end cap, said first solid axially aligned straight shaft having a near end and a distal end; said first solid axially aligned straight shaft extending outside of the elongated housing and having means on the ear end for attachment, said first solid axially aligned straight shaft being capable of free reciprocal movement in a direction along the first solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment; said first solid axially aligned straight shaft and second solid axially aligned straight shaft being capable of simultaneous rotation by the use of the spline located on the shafts of the first solid axially aligned straight shaft and the second solid axially aligned straight shaft;

a predetermined volume of a first gel layer capable of being converted from a unitary solid material to a crumb with properties and characteristics of a hydraulic fluid when pressure is applied thereto, said first gel layer surmounted on the near side of the piston stop plug, said first gel layer having a predetermined resistance to an applied force upon it;

a piston stop plug contained within said elongated housing at a point intermediate of the elongated housing distal end and near end, said piston stop plug being fixedly secured to the inside surface of the elongated housing; said piston stop plug having a centered aperture therethrough and having a bearing surface contained therein; said piston stop plug having a near side and a distal side, the piston stop plug located such that a reservoir is formed on the piston stop plug distal side thereof defined by the piston stop plug, the inside wall, and the alignment plug of the elongated housing; said piston stop plug having at least one communicative opening therethrough opening from the containment area for the piston stop plug to said reservoir, said first solid, axially aligned straight shaft passing through and being supported by said piston stop plug;

a means of varying the size of the communicative openings in the piston stop plug, said means comprising a plate interfacing intimately with the distal side of the piston stop plug, said plate having a centered aperture for accepting the first solid axially aligned straight shaft therethrough; said plate having a centered axis parallel to the first solid axially aligned straight shaft and said plate having a near side and a distal side, said near side having at least one protrusion on the surface thereof, each said protrusion being aligned with a communicative opening in the piston stop plug, said plate being capable of moving linearly along the first solid axially aligned straight shaft, the distal side of the plate having a cam surface thereon;

a rotatable cam means having a near end and a distal end, said rotatable cam means comprising a cam plate, said cam plate being fixedly mounted on the near end such that the cam on the cam plate mates operatively with the cam surface of the plate for varying the size of the communicative openings in the piston stop plug;

the rotatable cam means comprising elongated arms extending from the cam plate to a point outside of the distal end of the elongate housing, said arms having a near end and a distal end, the near end being attached to the cam plate, the distal end being attached to a handle for rotating the rotatable cam means;

a piston, said piston being mounted on the first solid axially aligned straight shaft and intimately interfacing with the rotatable cam means.

38. A method of providing energy absorption for a vehicle the method comprising:
(I) determining at least one point of theoretical collapse point in the vehicle which would be susceptible to collapse by a crash of the vehicle,
(II) affixing at least one energy absorbing device to the body frame at said one theoretical collapse point, wherein the device comprises:
an impact suppression device with energy absorbing capability comprising:
an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;
a means for mounting the elongated housing, the elongated housing being mountable to the body frame of a vehicle;
a first solid axially aligned straight shaft inserted through and supported in the centered aperture of the end cap, said first solid axially aligned straight shaft having a near end and a distal end; said first solid axially aligned straight shaft extending outside of the elongated housing and having means on the near end for attachment, said first solid axially aligned straight shaft being capable of free reciprocal movement in a direction along the solid straight shaft axial alignment upon the application of an applied force;
a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment; said first solid axially aligned straight shaft and second solid axially aligned straight shaft being capable of simultaneous rotation by the use of the spline located on the first solid axially aligned straight shaft and the second solid axially aligned straight shaft;
a piston stop plug contained within said elongated housing at a point intermediate of the elongated housing distal end and near end, said piston stop plug being fixedly secured to the inside surface of the elongated housing and said piston stop plug having a near side and a distal side; said piston stop plug having a centered aperture therethrough;
said first solid axially aligned straight shaft passing through and being supported by said piston stop plug;
a predetermined volume of a first gel layer capable of being converted from a unitary solid material to a crumb with properties and characteristics of a hydraulic fluid when pressure is applied thereto, said first gel layer being surmounted on the near side of the piston stop plug, said first gel layer having a predetermined resistance to an applied force upon it;
a piston, said piston being mounted on the first solid axially aligned straight shaft and intimately interfacing with the first gel layer, said piston having a near side and an outside surface, the piston located on the first solid axially aligned straight shaft such that a reservoir is formed on the piston near side thereof defined by the piston, the inside wall, and the end cap of the elongated housing; said elongated housing having one or more channels in the inside surface thereof, which channels provide a communication between the first gel layer and the reservoir.

39. A vehicle body frame having affixed therein, at at least one point of susceptible collapse during a crash of the vehicle, an energy absorption device, wherein the device is an impact suppression device with energy absorbing capability comprising:
an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;
a means for mounting the elongated housing, the elongated housing being mountable to the body frame of a vehicle;
a first solid axially aligned straight shaft inserted through and supported in the centered aperture of the end cap, said first solid axially aligned straight shaft having a near end and a distal end; said first solid axially aligned straight shaft extending outside of the elongated housing and having means on the near end for attachment, said solid axially aligned straight shaft being capable of free reciprocal movement in a direction along the solid straight shaft axial alignment upon the application of an applied force;
a second solid axially aligned straight shaft inserted through and supported in the centered aperture of the alignment plug, said second solid axially aligned straight shaft having a near end and a distal end, said second solid axially aligned straight shaft extending outside of the elongated housing and straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment; said first solid axially aligned straight shaft and second solid axially aligned straight shaft being capable of simultaneous rotation by the use the spline located on the first solid axially aligned straight shaft and the second solid axially aligned straight shaft;
a piston stop plug contained within said elongated housing at a point intermediate of the elongated housing distal end and near end, said piston stop plug being fixedly secured to the inside surface of the elongated housing and said piston stop plug having a near side and a distal side; said piston stop plug having a centered aperture therethrough;

said first solid axially aligned straight shaft passing through and being supported by said piston stop plug;

a predetermined volume of a first gel layer capable of being converted from a unitary solid material to a crumb with properties and characteristics of a hydraulic fluid when pressure is applied thereto, said first gel layer being surmounted on the near side of the piston stop plug, said first gel layer having a predetermined resistance to an applied force upon it;

a piston, said piston being mounted on the first solid axially aligned straight shaft and intimately interfacing with the first gel layer, said piston having a near side and an outside surface, the piston located on the first solid axially aligned straight shaft such that a reservoir is formed on the piston near side thereof defined by the piston, the inside wall, and the end cap; said piston having at least one communicative opening from the first gel layer to said reservoir.

40. A vehicle body frame having affixed therein, at at least one point of susceptible collapse during a crash of the vehicle, an energy absorption device, wherein the device is an impact suppression device with energy absorbing capability comprising:

an elongated housing, said elongated housing having a near end, and a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being capable of being fixed into said elongated housing;

a means for mounting the elongated housing, the elongated housing being mountable to the body frame of a vehicle;

a first solid axially aligned straight shaft inserted through and supported in the centered aperture of the end cap, said solid axially aligned straight shaft having a near end and a distal end; said first solid axially aligned straight shaft extending outside of the elongated housing and having means on the near end for attachment, said solid axially aligned straight shaft being capable of free reciprocal movement in a direction along the solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment; said first solid axially aligned straight shaft and second solid axially aligned straight shaft being capable of simultaneous rotation by the use of the spline located on the first solid axially aligned straight shaft and the second solid axially aligned straight shaft;

a piston stop plug contained within said elongated housing at a point intermediate of the elongated housing distal end and near end, said piston stop plug being fixedly secured to the inside surface of the elongated housing and said piston stop plug having a near side and a distal side; said piston stop plug having a centered aperture therethrough;

said first solid axially aligned straight shaft passing through and being supported by said piston stop plug;

a predetermined volume of a first gel layer capable of being converted from a unitary solid material to a crumb with properties and characteristics of a hydraulic fluid when pressure is applied thereto, said first gel layer surmounted on the near side of the piston stop plug, said first gel layer having a predetermined resistance to an applied force upon it;

a predetermined volume of a second gel layer capable of being converted from a unitary solid material to a crumb with properties and characteristics of a hydraulic fluid when pressure is applied thereto, said second gel layer surmounted on the first gel layer, said second gel layer having a predetermined resistance to an applied force upon it, such resistance being greater than the applied force upon it, such resistance being greater than the resistance of the first gel layer;

a piston, said piston being mounted on the first solid axially aligned straight shaft and intimately interfacing with the second gel layer, said piston having a near side and an outside surface, the piston located on the first solid axially aligned straight shaft such that a reservoir is formed on the piston near side thereof defined by the piston, the inside wall, and the end cap of the elongated housing; said piston having at least one communicative opening from the second gel layer to said reservoir.

41. A vehicle body frame having affixed therein, at at least one point of susceptible collapse during a crash of the vehicle, an energy absorption device, wherein the device is an impact suppression device with energy absorbing capability comprising:

an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable to the body frame of a vehicle;

a first solid axially aligned straight shaft inserted through and supported in the centered aperture of the end cap, said first solid axially aligned straight shaft having a near end and a distal end; said first solid axially aligned straight shaft extending outside of the elongated housing and having means on the near end for attachment, said first solid axially aligned straight shaft being capable of free reciprocal movement in a direction along the solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment; said first solid axially aligned straight shaft and the second solid axially aligned straight shaft being capable of simultaneous rotation by the use of the spline on the first solid axially aligned straight shaft and the second solid axially aligned straight shaft;

a piston stop plug contained within said elongated housing at a point intermediate of the elongated housing distal end and near end, said piston stop plug being fixedly secured to the inside surface of the elongated housing and said piston stop plug having a near side and a distal side; said piston stop plug having a centered aperture therethrough;

said first solid axially aligned straight shaft passing through and being supported by said piston stop plug;

a predetermined volume of a first gel layer capable of being converted from a unitary solid material to a crumb with properties and characteristics of a hydraulic fluid when pressure is applied thereto, said first gel layer being surmounted on the near side of the piston stop plug, said first gel layer having a predetermined resistance to an applied force upon it;

a piston, said piston being mounted on the first solid axially aligned straight shaft and intimately interfacing with the first gel layer, said piston having a near side, a distal side, and an outside surface, the piston located on the first solid axially aligned straight shaft such that a reservoir is formed on the piston near side thereof defined by the piston, the inside wall, and the end cap of the elongated housing; said piston having at least one communicative opening from the first gel layer to said reservoir;

a means of varying the size of the communicative openings in the piston, said means comprising a plate interfacing intimately with the distal side of the piston, said plate having a centered axis parallel to the first solid axially aligned straight shaft and having a centered aperture for accepting the first solid axially aligned straight shaft therethrough; said plate having at least one communicative opening that aligns with the communicative openings in the piston, said plate being rotatable around the centered axis by means of a rotatable turning means, said rotatable turning means comprising elongated arms extending from the plate to a point outside of the distal end of the elongated housing, said arms having a near end and a distal end, the near end being attached to the plate, the distal end being attached to a handle for rotating the rotating means.

42. A vehicle body frame having affixed therein, at at least one point of susceptible collapse during a crash of the vehicle, an energy absorption device, wherein the device is an impact suppression device with energy absorbing capability comprising:

an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable to the body frame of a vehicle;

a first solid axially aligned straight shaft inserted through and supported in the centered aperture of the end cap, said first solid axially aligned straight shaft having a near end and a distal end; said first solid axially aligned straight shaft extending outside of the elongated housing and having means on the near end for attachment, said solid axially aligned straight shaft being capable of free reciprocal movement in a direction along the solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment; said first solid axially aligned straight shaft and second solid axially aligned straight shaft being capable of simultaneous rotation by the use of the spline located on the first solid axially aligned straight shaft and second solid axially aligned straight shaft;

a piston stop plug contained within said elongated housing at a point intermediate of the elongated housing distal end and near end, said piston stop plug being fixedly secured to the inside surface of the elongated housing and said piston stop plug having a near side and a distal side; said piston stop plug having a centered aperture therethrough;

said first solid, axially aligned straight shaft passing through and being supported by said piston stop plug;

a predetermined volume of a first gel layer capable of being converted from a unitary solid material to a crumb with properties and characteristics of a hydraulic fluid when pressure is applied thereto, said first gel layer being surmounted on the near side of the piston stop plug, said first gel layer having a predetermined resistance to an applied force upon it;

a piston, said piston being mounted on the first solid axially aligned straight shaft and intimately interfacing with the first gel layer, said piston having a near side, a distal side, and an outside surface, the piston located on the first solid axially aligned straight shaft such that a reservoir is formed on the piston near side thereof defined by the piston, the inside wall, and the end cap of the elongated housing; said piston having at least one communicative opening from the first gel layer to said reservoir;

a means of varying the size of the communicative openings in the piston, said means comprising a plate interfacing intimately with the distal side of the piston, said plate having a centered aperture for accepting the first solid axially aligned straight shaft therethrough; said plate having a centered axis parallel to the first solid axially aligned straight shaft and said plate having a near side and a distal side, said near side having one or more protrusions on the surface thereof, each said protrusion being aligned with a communicative opening in the piston, said plate being capable of moving linearly along the first solid axially aligned straight shaft; the distal side of the plate having a cam surface thereon;

a rotatable cam means having a near end and a distal end, said rotatable cam means comprising a cam plate, said cam plate being fixedly mounted on the near end such that the cam on the cam plate mates operatively with the cam surface of the plate of the means of varying the size of the communicative openings in the piston;

the rotatable cam means comprising elongated arms extending from the cam plate to a point outside of the distal end of the elongated housing, said arms having a near end and a distal end, the near end being attached to the cam plate, the distal end being attached to a handle for rotating the rotatable cam means.

43. A vehicle body frame having affixed therein, at at least one point of susceptible collapse during a crash of the vehicle, an energy adsorption device, wherein the device is an impact suppression device with energy absorbing capability comprising:

an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable to the body frame of a vehicle;

a first solid axially aligned straight shaft inserted through and supported in the centered aperture of the end cap, said first solid axially aligned straight shaft having a near end and a distal end; said first solid axially aligned straight shaft extending outside of the elongated housing and having means on the near end for attachment, said first solid axially aligned straight shaft being capable of free reciprocal movement in a direction along the solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment;

said first solid axially aligned straight shaft and second solid axially aligned straight shaft being capable of simultaneous rotation by the use of the spline located on the shafts of the first solid axially aligned straight shaft and the second solid axially aligned straight shaft;

a piston stop plug contained within said elongated housing at a point intermediate of the elongated housing distal end and near end, said piston stop plug being fixedly secured to the inside surface of the elongated housing; said piston stop plug having a centered aperture therethrough; said piston stop plug having a near side and a distal side, the piston stop plug located such that a reservoir is formed on the piston stop plug distal side thereof defined by the piston stop plug, the inside wall, and the alignment plug of the elongated housing; said piston stop plug having at least one opening therethrough opening from the piston to said reservoir, said first solid axially aligned straight shaft passing through and being supported by said piston stop plug;

a predetermined volume of a first gel layer capable of being converted from a unitary solid material to a crumb with properties and characteristics of a hydraulic fluid when pressure is applied thereto, said first gel layer surmounted in a containment area on the near side of the piston stop plug, said first gel layer having a predetermined resistance to an applied force upon it;

a piston, said piston being mounted on the first solid axially aligned straight shaft and intimately interfacing with the first gel layer.

44. A vehicle body frame having affixed therein, at at least one point of susceptible collapse during a crash of the vehicle, an energy absorption device, wherein the device is an impact suppression device with energy absorbing capability comprising:

an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable to the body frame of a vehicle;

a first solid axially aligned straight shaft inserted through and supported in the centered aperture of the end cap, said first solid axially aligned straight shaft having a near end and a distal end; said first solid axially aligned straight shaft extending outside of the elongated housing and having means on the near end for attachment, said first solid axially aligned straight shaft being capable of free reciprocal movement in a direction along the solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment; said first solid axially aligned straight shaft and second solid axially aligned straight shaft being capable of simultaneous rotation by the use of the spline located on the shafts of the first solid axially aligned straight shaft and the second solid axially aligned straight shaft;

a piston stop plug contained within said elongated housing at a point intermediate of the elongated housing distal end and near end, said piston stop plug being fixedly secured to the inside surface of the elongated housing; said piston stop plug having a centered aperture therethrough; said piston stop plug having a near side and a distal side, the piston stop plug located such that a reservoir is formed on the piston stop plug distal side thereof defined by the piston stop plug, the inside wall, and the alignment plug of the elongated housing; said piston stop plug having one or more openings therethrough opening from the piston stop plug to said reservoir, said first solid axially aligned straight shaft passing through and being supported by said piston stop plug;

a predetermined volume of a first gel layer capable of being converted from a unitary solid material to a crumb with properties and characteristics of a hydraulic fluid when pressure is applied thereto, said first gel layer surmounted on the near side of the piston stop plug, said first gel layer having a predetermined resistance to an applied force upon it;

a piston, said piston being mounted on the first solid axially aligned straight shaft and intimately interfacing with the first gel layer;

a means of varying the size of the communicative openings in the piston stop plug, said means comprising a plate interfacing intimately with the distal side of the piston stop plug, said plate having a centered axis parallel to the first solid axially aligned straight shaft, said plate having a centered aperture for accepting the first solid axially aligned straight shaft therethrough and said plate having at least one communicative opening that aligns with the communicative openings in the piston stop plug, said plate being rotatable around the centered axis by means of a rotatable turning means, said rotatable turning means comprising elongated arms extending from the plate to a point outside of the distal end of the elongated housing, said arms having a near end and a distal end, the near end being attached to the plate, the distal end being attached to a handle for rotating the rotating means.

45. A vehicle body frame having affixed therein, at at least one point of susceptible collapse during a crash of the vehicle, an energy adsorption device, wherein the device is an impact suppression device with energy absorbing capability comprising:

elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable to the body frame of a vehicle;

a first solid axially aligned straight shaft inserted through and supported in the centered aperture of the end cap, said first solid axially aligned straight shaft having a near end and a distal end; said first solid axially aligned straight shaft extending outside of the elongated housing and having means on the near end for attachment, said first solid axially aligned straight shaft being capable of free reciprocal movement in a direction along the first solid straight shaft axial alignment upon the application of an applied force;

a second solid axially aligned straight shaft inserted through and supported in the centered aperture of the alignment plug, said second solid axially aligned straight shaft having a near end and a distal end, said second solid axially aligned straight shaft extending outside of the elongated housing and having means on the distal end for attachment, the distal end of the first solid axially aligned straight shaft and the near end of the second solid axially aligned straight shaft being detachedly joined together in axial alignment by a spline, said second solid axially aligned straight shaft being incapable of free reciprocal movement in a direction along the second solid straight shaft axial alignment; said first solid axially aligned straight shaft and second solid axially aligned straight shaft being capable of simultaneous rotation by the use of the spline located on the shafts of the first solid axially aligned straight shaft and the second solid axially aligned straight shaft;

a predetermined volume of a first gel layer capable of being converted from a unitary solid material to a crumb with properties and characteristics of a hydraulic fluid when pressure is applied thereto, said first gel layer surmounted on the near side of the piston stop plug, said first gel layer having a predetermined resistance to an applied force upon it;

a piston stop plug contained within said elongated housing at a point intermediate of the elongated housing distal end and near end, said piston stop plug being fixedly secured to the inside surface of the elongated housing; said piston stop plug having a centered aperture therethrough and having a bearing surface contained therein; said piston stop plug having a near side and a distal side, the piston stop plug located such that a reservoir is formed on the piston stop plug distal side thereof defined by the piston stop plug, the inside wall, and the alignment plug of the elongated housing; said piston stop plug having at least one communicative opening therethrough opening from the containment area for the piston stop plug to said reservoir, said first solid, axially aligned straight shaft passing through and being supported by said piston stop plug;

a means of varying the size of the communicative openings in the piston stop plug, said means comprising a plate interfacing intimately with the distal side of the piston stop plug, said plate having a centered aperture for accepting the first solid axially aligned straight shaft therethrough; said plate having a centered axis parallel to the first solid axially aligned straight shaft and said plate having a near side and a distal side, said near side having one or more protrusions on the surface thereof, each said protrusion being aligned with a communicative opening in the piston stop plug, said plate being capable of moving linearly along the first solid axially aligned straight shaft, the distal side of the plate having a cam surface thereon;

a rotatable cam means having a near end and a distal end, said rotatable cam means comprising a cam plate, said cam plate being fixedly mounted on the near end such that the cam on the cam plate mates operatively with the cam surface of the plate for varying the size of the communicative openings in the piston stop plug;

the rotatable cam means comprising elongated arms extending from the cam plate to a point outside of the distal end of the elongate housing, said arms having a near end and a distal end, the near end being attached to the cam plate, the distal end being attached to a handle for rotating the rotatable cam means;

a piston, said piston being mounted on the first solid axially aligned straight shaft and intimately interfacing with the rotatable cam means.

46. A vehicle body frame having affixed therein, at at least one point of susceptible collapse during a crash of the vehicle, an energy absorption device, wherein the device is an impact suppression device with energy absorbing capability comprising:

an elongated housing, said elongated housing having a near end, a distal end, an inside surface, and an inside wall; said elongated housing having an end cap located on the near end thereof, said end cap having a centered aperture therethrough and said end cap being fixed to said elongated housing, said elongated housing having an alignment plug on the distal end thereof, said alignment plug having a centered aperture therethrough and said alignment plug being fixed into said elongated housing;

a means for mounting the elongated housing, the elongated housing being mountable to the body frame of a vehicle;

a first solid axially aligned straight shaft inserted through and supported in the centered aperture of the end cap, said first solid axially aligned straight shaft having a near end and a a first solid axially aligned straight shaft inserted through and supported in the centered aperture of the end cap, said first solid axially aligned straight shaft having a near end and a distal end; said first solid axially aligned straight shaft extending outside of the elongated housing and having means on the near end for attachment, said first solid axially aligned straight shaft being capable of free reciprocal movement in a direction.

* * * * *